US012596870B2

(12) United States Patent
Pan et al.

(10) Patent No.: US 12,596,870 B2
(45) Date of Patent: Apr. 7, 2026

(54) SYSTEM AND METHOD FOR FACT-CHECKING COMPLEX CLAIMS WITH PROGRAM-GUIDED REASONING

(71) Applicant: Mohamed bin Zayed University of Artificial Intelligence, Abu Dhabi (AE)

(72) Inventors: Liangming Pan, Abu Dhabi (AE); Preslav Nakov, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 221 days.

(21) Appl. No.: 18/500,614

(22) Filed: Nov. 2, 2023

(65) Prior Publication Data

US 2025/0148203 A1     May 8, 2025

(51) Int. Cl.
*G06F 40/226*      (2020.01)
*G06F 3/04817*     (2022.01)
*G10L 15/26*       (2006.01)
(52) U.S. Cl.
CPC ........ *G06F 40/226* (2020.01); *G06F 3/04817* (2013.01); *G10L 15/26* (2013.01)
(58) Field of Classification Search
CPC ..... G06F 40/226; G06F 3/04817; G10L 15/26
See application file for complete search history.

(56) References Cited

U.S. PATENT DOCUMENTS

2012/0078826 A1*   3/2012   Ferrucci ................... G06N 7/01
                                                              706/12
2014/0164994 A1*   6/2014   Myslinski ........... G06F 3/04817
                                                              715/808
2017/0132199 A1*   5/2017   Vescovi ............... G06Q 10/101
2021/0334908 A1*   10/2021  Shu ........................ G06Q 50/01
2021/0357595 A1    11/2021  Perez
2023/0102162 A1    3/2023   Santana De Oliveira et al.

FOREIGN PATENT DOCUMENTS

JP          2023-53867 A       4/2023

OTHER PUBLICATIONS

Jie Zhou et al., GEAR: Graph-based evidence aggregating and reasoning for fact verification, Proceedings of the 57th Annual Meeting of the Association for Computational Linguistics (ACL), https://arxiv.org/pdf/1908.01 (Year: 2019).*

(Continued)

*Primary Examiner* — Justin R. Blaufeld
(74) *Attorney, Agent, or Firm* — Oblon, McClelland, Maier & Neustadt, L.L.P.

(57) ABSTRACT

A method and system are arranged for fact checking electronically posted claims. The system includes an input/output device for inputting a textual complex claim as a natural language statement with a combination of two or more facts and outputting an indication that the textual complex claim is true or false. A processor connected to the input/output device generates, by a program generation module, a reasoning program for the input complex claim as a sequence of reasoning steps, where each step directs to a function in a set of sub-task functions. The processor generates, by a program execution module, each step in the reasoning program to a respective sub-task function and executes the respective sub-task function in order to provide the outputted indication.

19 Claims, 30 Drawing Sheets

(56)        References Cited

OTHER PUBLICATIONS

Kojima, T., Gu, S. S., Reid, M., Matsuo, Y., & Iwasawa, Y. (Nov. 2022). Large language models are zero-shot reasoners. In Proceedings of the 36th International Conference on Neural Information Processing Systems (pp. 22199-22213). (Year: 2022).*

Wei, Jason, Xuezhi Wang, Dale Schuurmans, Maarten Bosma, Fei Xia, Ed Chi, Quoc V. Le, and Denny Zhou. "Chain-of-thought prompting elicits reasoning in large language models." Advances in neural information processing systems 35 (2022): 24824-24837. (Year: 2022).*

Wang, Xuezhi, Jason Wei, Dale Schuurmans, Quoc Le, H. Chi, Sahran Narag, Aakanksha Chowdhery, and Denny Zhou. "Self-Consistency Improves Chain of Thought Reasoning in Language Models." (Year: 2022).*

Lee et al. ; Language Models as Fact Checkers? ; Jul. 24, 2020 ; 6 Pages.

* cited by examiner

''' Generate a python-like program that describes the reasoning steps required to verify the claim step-by-step. You can call three functions in the program: 1. Question() to answer a question; 2. Verify() to verify a simple claim; 3. Predict() to predict the veracity label . '''

The claim is that Both James Cameron and the director of the film
     Interstellar were born in Canada .

```
def program():
    fact_1 = Verify(" James Cameron was born in Canada.")
    Answer_1 = Question(" Who is the director of the film Interstellar?")
    fact_2 = Verify("{Answer_1} was born in Canada.")
    label = Predict(fact_1 and fact_2)
```

(... more in-context examples here ...)

The claim is that <input_claim>
def program ():

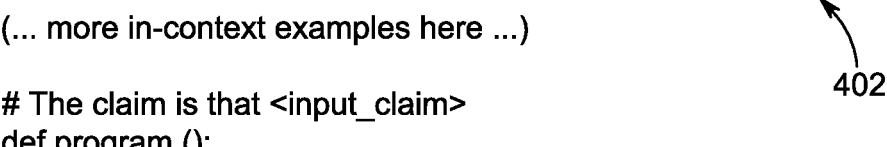

FIG. 4

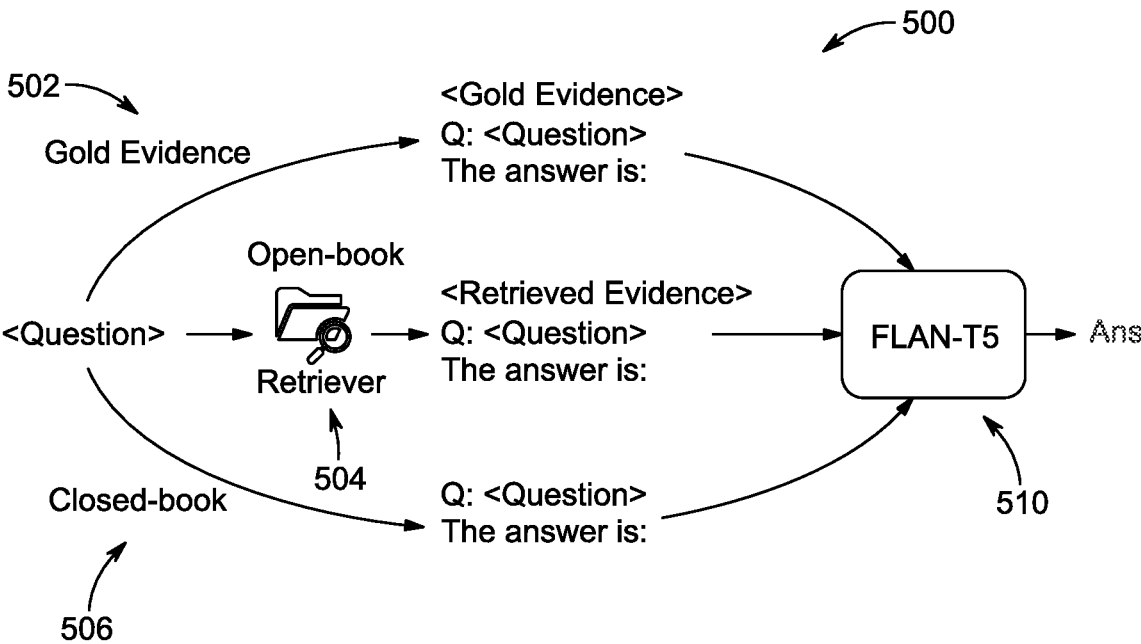

FIG. 5

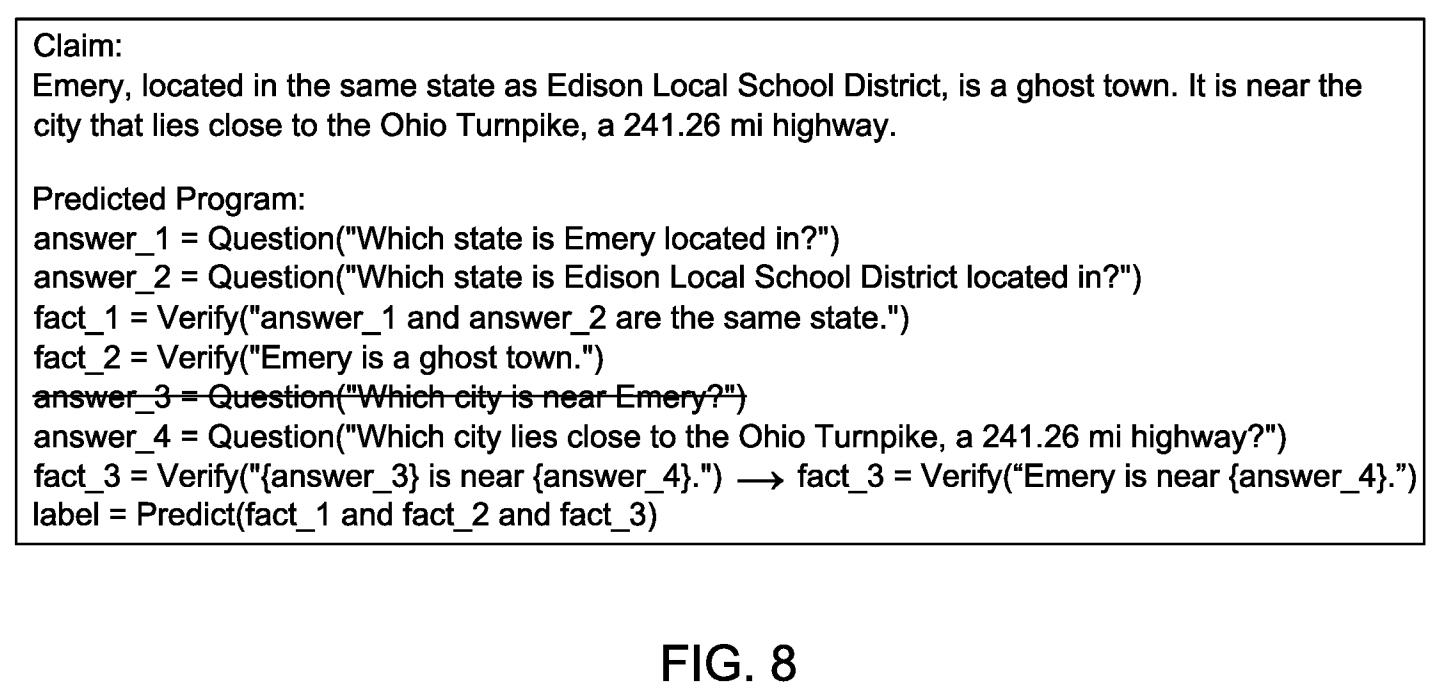

Claim:
Emery, located in the same state as Edison Local School District, is a ghost town. It is near the city that lies close to the Ohio Turnpike, a 241.26 mi highway.

Predicted Program:
answer_1 = Question("Which state is Emery located in?")
answer_2 = Question("Which state is Edison Local School District located in?")
fact_1 = Verify("answer_1 and answer_2 are the same state.")
fact_2 = Verify("Emery is a ghost town.")
answer_3 = Question("Which city is near Emery?")
answer_4 = Question("Which city lies close to the Ohio Turnpike, a 241.26 mi highway?")
fact_3 = Verify("{answer_3} is near {answer_4}.") → fact_3 = Verify("Emery is near {answer_4}.")
label = Predict(fact_1 and fact_2 and fact_3)

FIG. 8

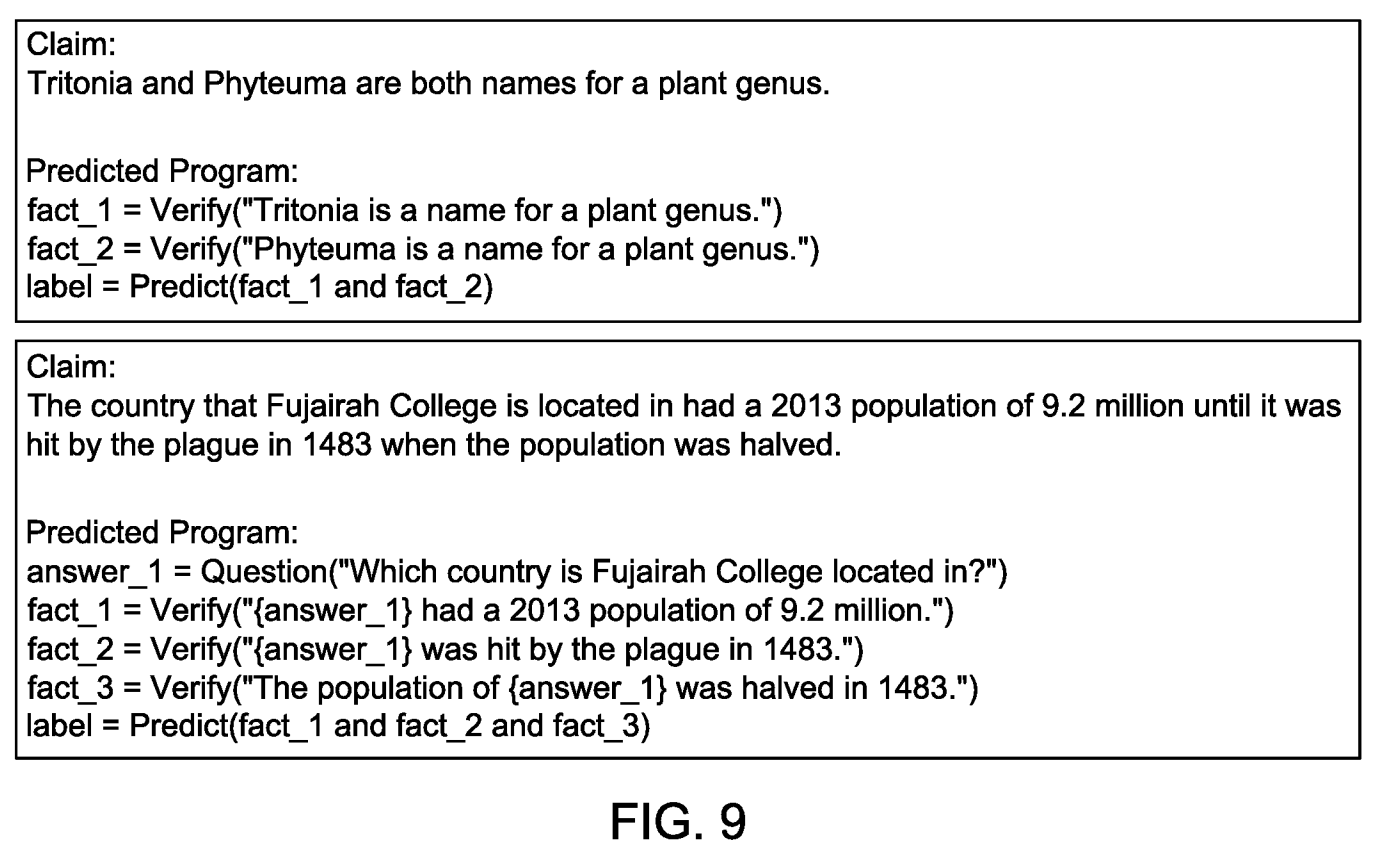

Claim:
Tritonia and Phyteuma are both names for a plant genus.

Predicted Program:
fact_1 = Verify("Tritonia is a name for a plant genus.")
fact_2 = Verify("Phyteuma is a name for a plant genus.")
label = Predict(fact_1 and fact_2)

Claim:
The country that Fujairah College is located in had a 2013 population of 9.2 million until it was hit by the plague in 1483 when the population was halved.

Predicted Program:
answer_1 = Question("Which country is Fujairah College located in?")
fact_1 = Verify("{answer_1} had a 2013 population of 9.2 million.")
fact_2 = Verify("{answer_1} was hit by the plague in 1483.")
fact_3 = Verify("The population of {answer_1} was halved in 1483.")
label = Predict(fact_1 and fact_2 and fact_3)

FIG. 9

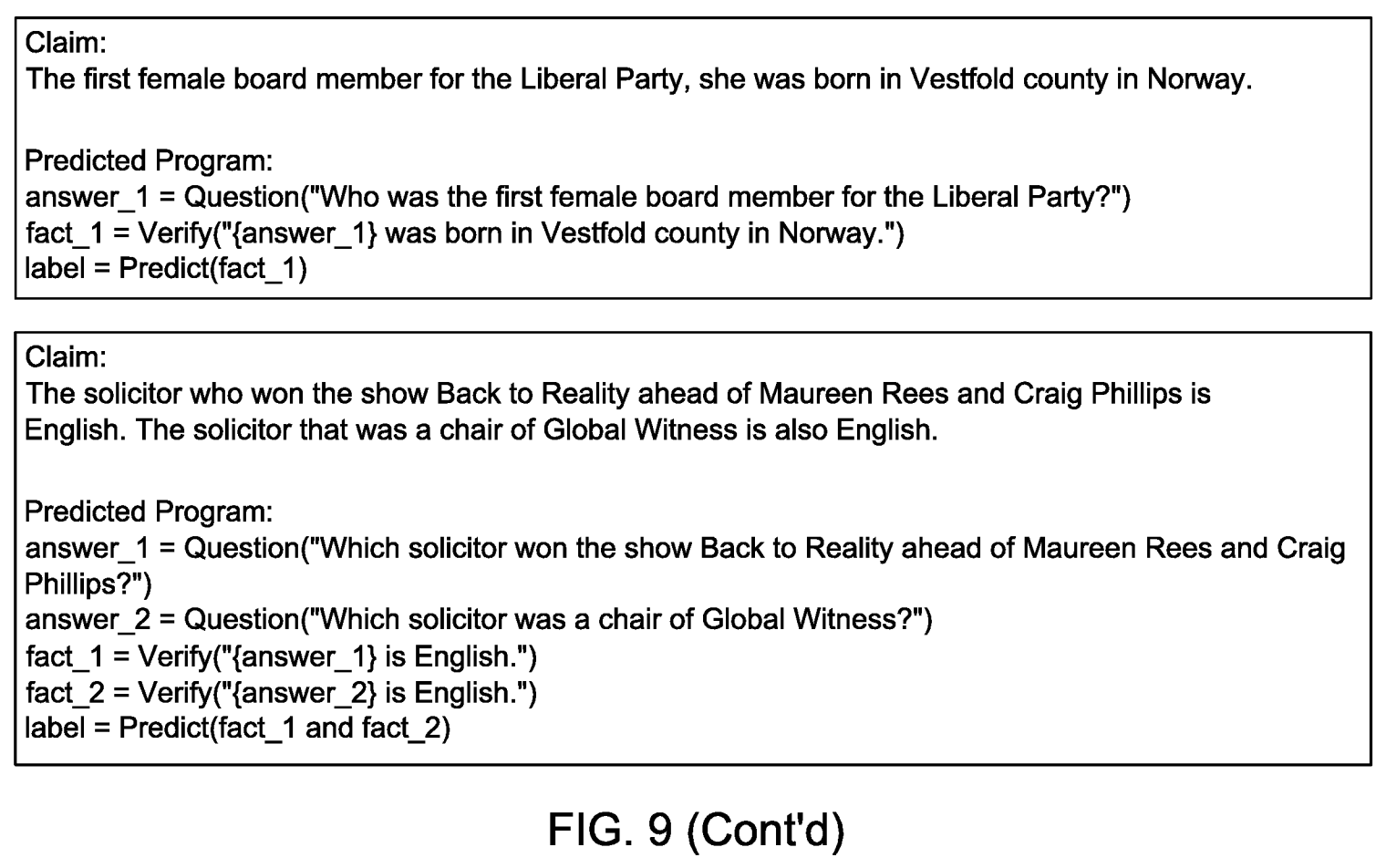

Claim:
The first female board member for the Liberal Party, she was born in Vestfold county in Norway.

Predicted Program:
answer_1 = Question("Who was the first female board member for the Liberal Party?")
fact_1 = Verify("{answer_1} was born in Vestfold county in Norway.")
label = Predict(fact_1)

Claim:
The solicitor who won the show Back to Reality ahead of Maureen Rees and Craig Phillips is English. The solicitor that was a chair of Global Witness is also English.

Predicted Program:
answer_1 = Question("Which solicitor won the show Back to Reality ahead of Maureen Rees and Craig Phillips?")
answer_2 = Question("Which solicitor was a chair of Global Witness?")
fact_1 = Verify("{answer_1} is English.")
fact_2 = Verify("{answer_2} is English.")
label = Predict(fact_1 and fact_2)

FIG. 9 (Cont'd)

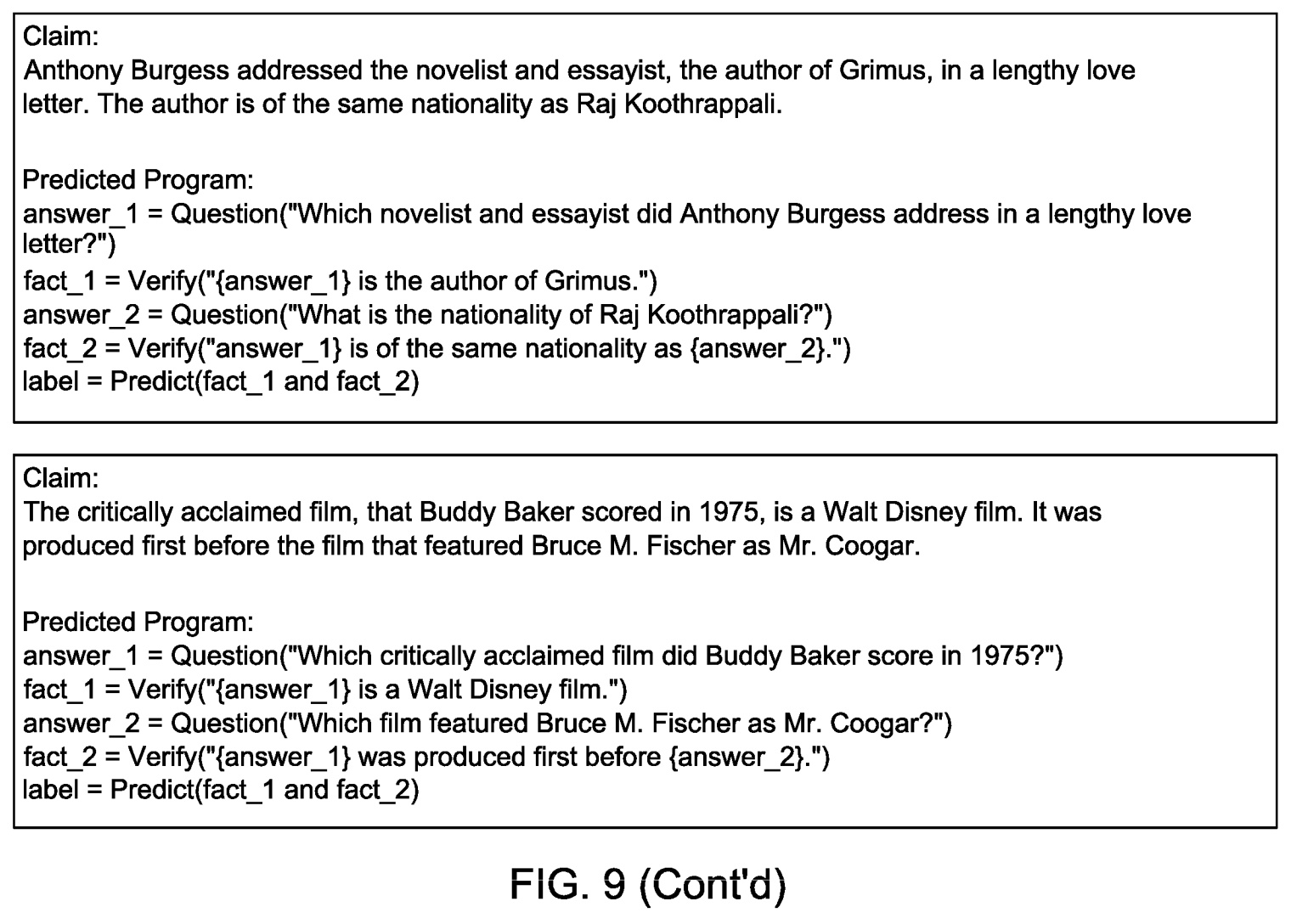

Claim:
Anthony Burgess addressed the novelist and essayist, the author of Grimus, in a lengthy love letter. The author is of the same nationality as Raj Koothrappali.

Predicted Program:
answer_1 = Question("Which novelist and essayist did Anthony Burgess address in a lengthy love letter?")
fact_1 = Verify("{answer_1} is the author of Grimus.")
answer_2 = Question("What is the nationality of Raj Koothrappali?")
fact_2 = Verify("answer_1} is of the same nationality as {answer_2}.")
label = Predict(fact_1 and fact_2)

Claim:
The critically acclaimed film, that Buddy Baker scored in 1975, is a Walt Disney film. It was produced first before the film that featured Bruce M. Fischer as Mr. Coogar.

Predicted Program:
answer_1 = Question("Which critically acclaimed film did Buddy Baker score in 1975?")
fact_1 = Verify("{answer_1} is a Walt Disney film.")
answer_2 = Question("Which film featured Bruce M. Fischer as Mr. Coogar?")
fact_2 = Verify("{answer_1} was produced first before {answer_2}.")
label = Predict(fact_1 and fact_2)

FIG. 9 (Cont'd)

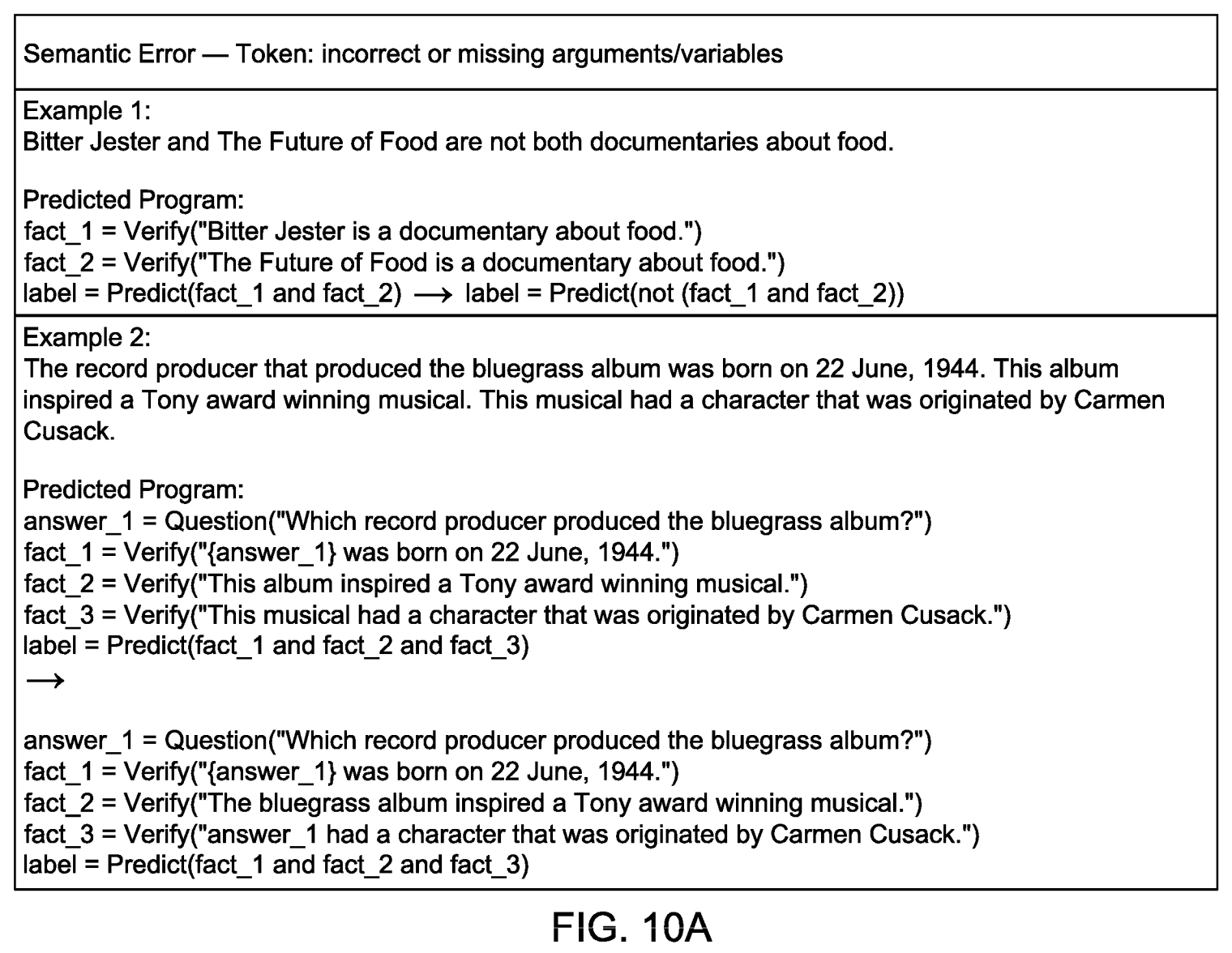

Semantic Error — Token: incorrect or missing arguments/variables

Example 1:
Bitter Jester and The Future of Food are not both documentaries about food.

Predicted Program:
fact_1 = Verify("Bitter Jester is a documentary about food.")
fact_2 = Verify("The Future of Food is a documentary about food.")
label = Predict(fact_1 and fact_2) ⟶ label = Predict(not (fact_1 and fact_2))

Example 2:
The record producer that produced the bluegrass album was born on 22 June, 1944. This album inspired a Tony award winning musical. This musical had a character that was originated by Carmen Cusack.

Predicted Program:
answer_1 = Question("Which record producer produced the bluegrass album?")
fact_1 = Verify("{answer_1} was born on 22 June, 1944.")
fact_2 = Verify("This album inspired a Tony award winning musical.")
fact_3 = Verify("This musical had a character that was originated by Carmen Cusack.")
label = Predict(fact_1 and fact_2 and fact_3)
↓ answer_1 = Question("Which record producer produced the bluegrass album?")
fact_1 = Verify("{answer_1} was born on 22 June, 1944.")
fact_2 = Verify("The bluegrass album inspired a Tony award winning musical.")
fact_3 = Verify("answer_1 had a character that was originated by Carmen Cusack.")
label = Predict(fact_1 and fact_2 and fact_3)

FIG. 10A

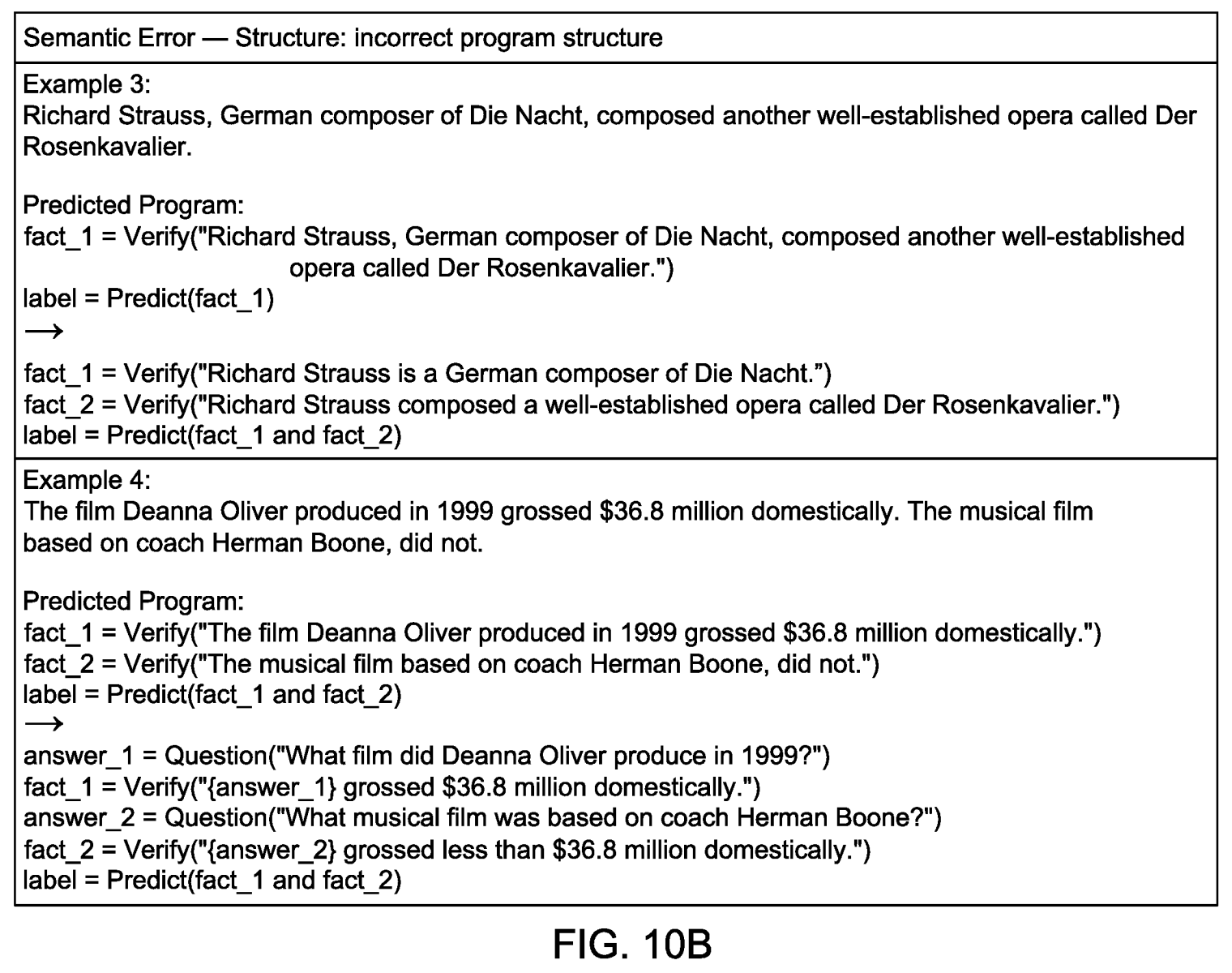

Semantic Error — Structure: incorrect program structure

Example 3:
Richard Strauss, German composer of Die Nacht, composed another well-established opera called Der Rosenkavalier.

Predicted Program:
fact_1 = Verify("Richard Strauss, German composer of Die Nacht, composed another well-established opera called Der Rosenkavalier.")

label = Predict(fact_1)
↑ fact_1 = Verify("Richard Strauss is a German composer of Die Nacht.")
fact_2 = Verify("Richard Strauss composed a well-established opera called Der Rosenkavalier.")
label = Predict(fact_1 and fact_2)

Example 4:
The film Deanna Oliver produced in 1999 grossed $36.8 million domestically. The musical film based on coach Herman Boone, did not.

Predicted Program:
fact_1 = Verify("The film Deanna Oliver produced in 1999 grossed $36.8 million domestically.")
fact_2 = Verify("The musical film based on coach Herman Boone, did not.")
label = Predict(fact_1 and fact_2)
↑ answer_1 = Question("What film did Deanna Oliver produce in 1999?")
fact_1 = Verify("{answer_1} grossed $36.8 million domestically.")
answer_2 = Question("What musical film was based on coach Herman Boone?")
fact_2 = Verify("{answer_2} grossed less than $36.8 million domestically.")
label = Predict(fact_1 and fact_2)

FIG. 10B

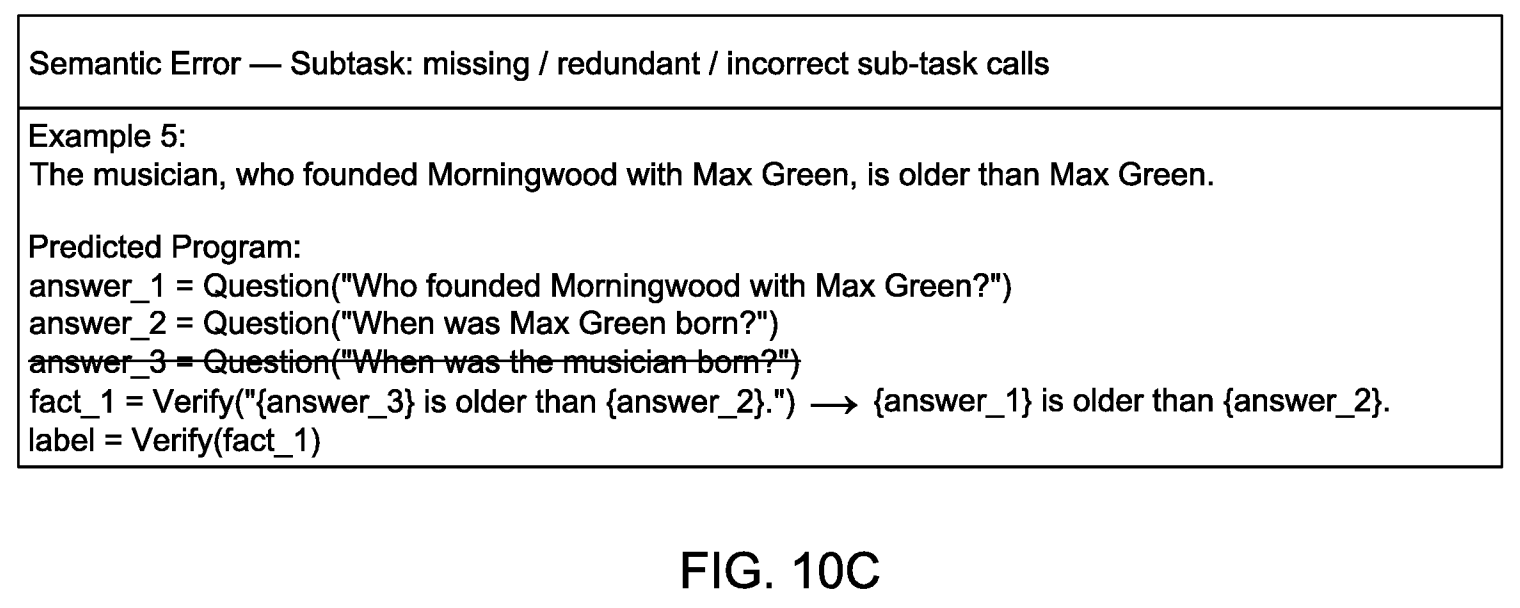

Semantic Error — Subtask: missing / redundant / incorrect sub-task calls

Example 5:
The musician, who founded Morningwood with Max Green, is older than Max Green.

Predicted Program:
answer_1 = Question("Who founded Morningwood with Max Green?")
answer_2 = Question("When was Max Green born?")
~~answer_3 = Question("When was the musician born?")~~
fact_1 = Verify("{answer_3} is older than {answer_2}.") → {answer_1} is older than {answer_2}.
label = Verify(fact_1)

FIG. 10C

```
"'Generate a python -like program that describes the reasoning steps required to
verify the claim step -by-step. You can call three functions in the program: 1.
Question () to answer a question; 2. Verify () to verify a simple claim; 3.
Predict () to predict the veracity label.'"

# The claim is that Howard University Hospital and Providence Hospital are both
    located in Washington , D.C.
def program ():
    fact_1 = Verify("Howard University Hospital is located in Washington , D.C.")
    fact_2 = Verify("Providence Hospital is located in Washington , D.C.")
    label = Predict(fact_1 and fact_2)

# The claim is that WWE Super Tuesday took place at an arena that currently goes by
    the name TD Garden.
def program ():
    answer_1 = Question("Which arena the WWE Super Tuesday took place?")
    fact_1 = Verify(f"answer_1 currently goes by the name TD Garden.")
    label = Predict(fact_1)
```

FIG. 11

```
# The claim is that Talking Heads , an American rock band that was "one of the most
    critically acclaimed bands of the 80's" is featured in KSPN's AAA format.
def program ():
    fact_1 = Verify("Talking Heads is an American rock band that was 'one of the
    most critically acclaimed bands of the 80's'.")
    fact_2 = Verify("Talking Heads is featured in KSPN's AAA format.")
    label = Predict(fact_1 and fact_2)

# The claim is that An IndyCar race driver drove a Formula 1 car designed by Peter
    McCool during the 2007 Formula One season.
def program ():
    answer_1 = Question("Which Formula 1 car was designed by Peter McCool during the
    2007 Formula One season?")
    fact_1 = Verify(f"An IndyCar race driver drove the car {answer_1}.")
    label = Predict(fact_1)
```

FIG. 11 (Cont'd)

```
# The claim is that Gina Bramhill was born in a village. The 2011 population of the
    area that includes this village was 167,446.
def program ():
    answer_1 = Question("Which village was Gina Bramhill born in?")
    fact_1 = Verify(f"The 2011 population of the area that includes answer_1 was
167,446.")
    label = Predict(fact_1)

# The claim is that Don Ashley Turlington graduated from Saint Joseph 's College , a
    private Catholic liberal arts college in Standish.
def program ():
    fact_1 = Verify("Saint Joseph 's College is a private Catholic liberal arts
college is located in Standish.")
    fact_2 = Verify(f"Don Ashley Turlington graduated from Saint Joseph 's College.")
    label = Predict(fact_1 and fact_2)
```

FIG. 11 (Cont'd)

```
# The claim is that Gael and Fitness are not published in the same country.
def program ():
    answer_1 = Question("Which country was Gael published in?")
    answer_2 = Question("Which country was Fitness published in?")
    fact_1 = Verify(f"answer_1 and answer_2 are not the same country.")
    label = Predict(fact_1)

# The claim is that Blackstar is the name of the album released by David Bowie that
    was recorded in secret.
def program ():
    fact_1 = Verify("David Bowie released an album called Blackstar.")
    fact_2 = Verify("David Bowie recorded an album in secret.")
    label = Predict(fact_1 and fact_2)

# The claim is that In the 2004 Hockey film produced by a former major league
    baseball pitcher Kurt Russell played the USA coach.
def program ():
    answer_1 = Question("Which 2004 Hockey film was produced a former major league
```

FIG. 11 (Cont'd)

```
baseball pitcher?")
fact_1 = Verify("Kurt Russell played the USA coach in the film answer_1 .")
label = Predict(fact_1)

# The claim is that Along with the New York Islanders and the New York Rangers , the
    New Jersey Devils NFL franchise is popular in the New York metropolitan area.
def program ():
    fact_1 = Verify("The New York Islanders and the New York Rangers are popular in
    the New York metropolitan area.")
    fact_2 = Verify("The New Jersey Devils NFL franchise is popular in the New York
    metropolitan area.")
    label = Predict(fact_1 and fact_2)

# The claim is that Jack McFarland is the best known role of the host of the 64th
    Annual Tony Awards.
def program ():
    answer_1 = Question("Who is the host of the 64th Annual Tony Awards?")
    fact_1 = Verify(f\"Jack McFarland is the best known role of {answer_1}.")
    label = Predict(fact_1)
```

FIG. 11 (Cont'd)

```
# The claim is that The song recorded by Fergie that was produced by Polow da Don
    and was followed by Life Goes On was M.I.L.F.$.
def program ():
    fact_1 = Verify("M.I.L.F.$ was recorded by Fergie that was produced by Polow da
    Don.")
    fact_2 = Verify("M.I.L.F.$ was was followed by Life Goes On.")
    label = Predict(fact_1 and fact_2)

# The claim is that Eatza Pizza and Your Pie were not founded in the same state.
def program ():
    answer_1 = Question("Which state was Eatza Pizza founded in?")
    answer_2 = Question("Which state was Your Pie founded in?")
    fact_1 = Verify(f"answer_1 and answer_2 are not the same state.")
    label = Predict(fact_1)

# The claim is that Gregg Rolie and Rob Tyner , are not a keyboardist.
def program ():
    fact_1 = Verify("Gregg Rolie is not a keyboardist.")
    fact_2 = Verify("Rob Tyner is not a keyboardist.")
    label = Predict(fact_1 and fact_2)
```

FIG. 11 (Cont'd)

```
# The claim is that Maria Esther Andion Bueno , not Jimmy Connors , is the player that
    is from Brazil.
def program ():
    fact_1 = Verify("Maria Esther Andion Bueno is from Brazil.")
    fact_2 = Verify("Jimmy Connors is not from Brazil.")
    label = Predict(fact_1 and fact_2)

# The claim is that Vladimir Igorevich Arnold died after Georg Cantor.
def program ():
    answer_1 = Question("When did Vladimir Igorevich Arnold die?")
    answer_2 = Question("When did Georg Cantor die?")
    fact_1 = Verify(f"answer_1 is after answer_2 .")
    label = Predict(fact_1)

# The claim is that Barton Mine was halted by a natural disaster not Camlaren Mine.
def program ():
    fact_1 = Verify("Barton Mine was halted by a natural disaster.")
    fact_2 = Verify("Camlaren Mine was not halted by a natural disaster.")
    label = Predict(fact_1 and fact_2)

# The claim is that John O'Hara and Rabindranath Tagore are not the same nationality
def program ():
    answer_1 = Question("What is the nationality of John O'Hara?")
    answer_2 = Question("What is the nationality of Rabindranath Tagore?")
    fact_1 = Verify(f"answer_1 and answer_2 are not the same nationality.")
    label = Predict(fact_1)
```

FIG. 11 (Cont'd)

```
# The claim is that Thomas Loren Friedman has won more Pulitzer Prizes than Colson
    Whitehead.
def program ():
    answer_1 = Question("How many Pulitzer Prizes has Thomas Loren Friedman won?")
    answer_2 = Question("How many Pulitzer Prizes has Colson Whitehead won?")
    fact_1 = Verify(f"answer_1 is more than answer_2 .")
    label = Predict(fact_1)

# The claim is that The model of car Trevor Bayne drives was introduced for model
    year 2006. The Rookie of The Year in the 1997 CART season drives it in the
    NASCAR Sprint Cup.
def program ():
    answer_1 = Question("Which model of car is drived by Trevor Bayne?")
    fact_1 = Verify(f"answer_1 was introduced for model year 2006.")
    answer_2 = Question("Who is the Rookie of The Year in the 1997 CART season?")
    fact_2 = Verify(f"answer_2 drives the model of car Trevor Bayne drives in the
    NASCAR Sprint Cup.")
    label = predict(fact_1 and fact_2)

# The claim is that <input_claim>
def program ():
```

FIG. 11 (Cont'd)

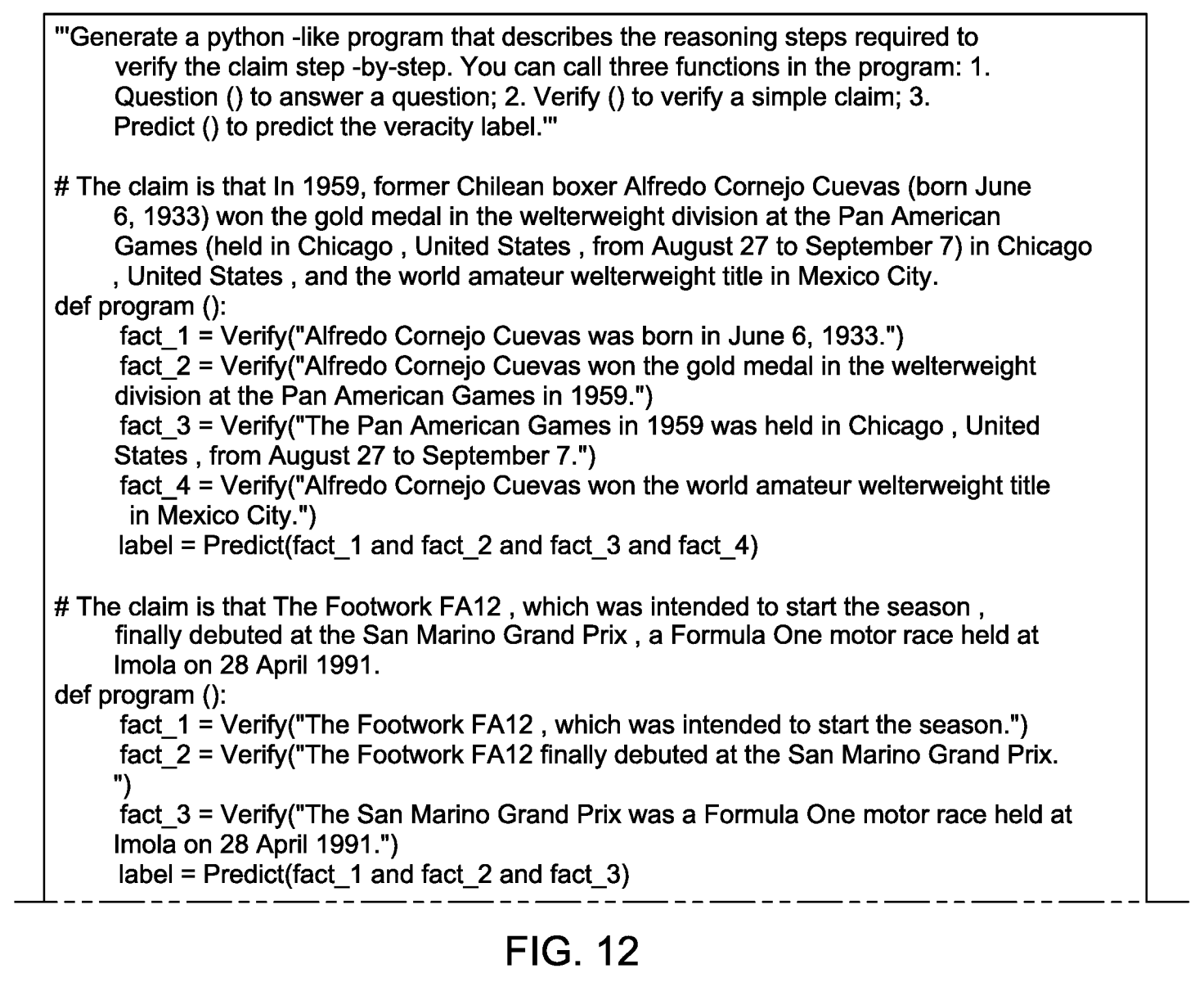

"Generate a python -like program that describes the reasoning steps required to verify the claim step -by-step. You can call three functions in the program: 1. Question () to answer a question; 2. Verify () to verify a simple claim; 3. Predict () to predict the veracity label.'"

The claim is that In 1959, former Chilean boxer Alfredo Cornejo Cuevas (born June 6, 1933) won the gold medal in the welterweight division at the Pan American Games (held in Chicago , United States , from August 27 to September 7) in Chicago , United States , and the world amateur welterweight title in Mexico City.

```
def program ():
    fact_1 = Verify("Alfredo Cornejo Cuevas was born in June 6, 1933.")
    fact_2 = Verify("Alfredo Cornejo Cuevas won the gold medal in the welterweight division at the Pan American Games in 1959.")
    fact_3 = Verify("The Pan American Games in 1959 was held in Chicago , United States , from August 27 to September 7.")
    fact_4 = Verify("Alfredo Cornejo Cuevas won the world amateur welterweight title in Mexico City.")
    label = Predict(fact_1 and fact_2 and fact_3 and fact_4)
```

The claim is that The Footwork FA12 , which was intended to start the season , finally debuted at the San Marino Grand Prix , a Formula One motor race held at Imola on 28 April 1991.

```
def program ():
    fact_1 = Verify("The Footwork FA12 , which was intended to start the season.")
    fact_2 = Verify("The Footwork FA12 finally debuted at the San Marino Grand Prix.")
    fact_3 = Verify("The San Marino Grand Prix was a Formula One motor race held at Imola on 28 April 1991.")
    label = Predict(fact_1 and fact_2 and fact_3)
```

FIG. 12

```
# The claim is that SkyHigh Mount Dandenong (formerly Mount Dandenong Observatory)
    is a restaurant located on top of Mount Dandenong , Victoria , Australia.
def program ():
    fact_1 = Verify("SkyHigh Mount Dandenong is a restaurant located on top of Mount
        Dandenong , Victoria , Australia.")
    fact_2 = Verify("SkyHigh Mount Dandenong is formerly known as Mount Dandenong
        Observatory.")
    label = Predict(fact_1 and fact_2)

# The claim is that Before the first Europeans arrived or copra companies leased it ,
    Maupihaa was home to Inca's in ancient times.
def program ():
    fact_1 = Verify("Maupihaa was home to Inca's in ancient times.")
    fact_2 = Verify("Maupihaa was home to Inca's before the first Europeans arrived
        or copra companies leased it.")
    label = Predict(fact_1 and fact_2)
```

FIG. 12 (Cont'd)

```
# The claim is that Shulin , a 33.1288 km (12.7911 sq mi) land located in New Taipei
    City , China , a country in East Asia , has a total population of 183 ,946 in
    December 2018.
def program ():
    fact_1 = Verify("Shulin is a 33.1288 km (12.7911 sq mi) land located in New
        Taipei City , China.")
    fact_2 = Verify("Shulin has a total population of 183 ,946 in December 2018.")
    label = Predict(fact_1 and fact_2)

# The claim is that Sumo wrestler Toyozakura Toshiaki committed match -fixing , ending
    his career in 2011 that started in 1989.
def program ():
    fact_1 = Verify("Toyozakura Toshiaki ended his career in 2011 that started in
        1989.")
    fact_2 = Verify("Toyozakura Toshiaki is a Sumo wrestler.")
    fact_3 = Verify("Toyozakura Toshiaki committed match -fixing.")
    label = Predict(fact_1 and fact_2 and fact_3)

# The claim is that In 1959, former Chilean boxer Alfredo Cornejo Cuevas (born June
    6, 1933) won the gold medal in the welterweight division at the Pan American
    Games (held in Chicago , United States , from August 27 to September 7) in Chicago
```

FIG. 12 (Cont'd)

```
, United States , and the world amateur welterweight title in Mexico City.
def program ():
    fact_1 = Verify("Alfredo Cornejo Cuevas is a former Chilean boxer.")
    fact_2 = Verify("Alfredo Cornejo won the gold medal in the welterweight division
        at the Pan American Games.")
    fact_3 = Verify("The Pan American Games was held in Chicago , United States , from
        August 27 to September 7.")
    fact_4 = Verify("Alfredo Cornejo won the world amateur welterweight title in
        Mexico City.")
    label = Predict(fact_1 and fact_2 and fact_3 and fact_4)

# The claim is that Adductor hiatus is associated with nine structures , seven of
    which enter and leave through hiatus.
def program ():
    fact_1 = Verify("Adductor hiatus is associated with nine structures.")
    fact_2 = Verify("Seven of the nine structures associated with Adductor hiatus
        enter and leave through hiatus.")
    label = Predict(fact_1 and fact_2)
```

FIG. 12 (Cont'd)

```
# The claim is that Ifor Bowen Lloyd was educated at Winchester (an independent
    boarding school for boys in the British public school tradition) and Exeter
    College , Oxford where he was a member of the Library Committee of the Oxford
    Union Society , as well as, received a BA in Modern History in 1924.
def program ():
    fact_1 = Verify("Ifor Bowen Lloyd was educated at Winchester and Exeter College ,
        Oxford.")
    fact_2 = Verify("Winchester is an independent boarding school for boys in the
        British public school tradition.")
    fact_3 = Verify("While at Oxford , Ifor Bowen Lloyd was a member of the Library
        Committee of the Oxford Union Society.")
    fact_4 = Verify("Ifor Bowen Lloyd received a BA in Modern History in 1924 at
        Oxford.")
    label = Predict(fact_1 and fact_2 and fact_3 and fact_4)

# The claim is that In the 2001 Stanley Cup playoffs Eastern Conference Semifinals
    Devils ' Elias scored and Maple Leafs ' left Devils player Scott Neidermayer hurt.
def program ():
    fact_1 = Verify("In the 2001 Stanley Cup playoffs Eastern Conference Semifinals
        Devils ' Elias scored.")
    fact_2 = Verify("Maple Leafs ' left Devils player Scott Neidermayer hurt.")
    label = Predict(fact_1 and fact_2)
```

FIG. 12 (Cont'd)

```
# The claim is that Teldenia helena is a moth first described in 1967 by Wilkinson.
def program ():
    fact_1 = Verify("Teldenia helena is a moth.")
    fact_2 = Verify("Teldenia helena was first described by Wilkinson in 1967.")
    label = Predict(fact_1 and fact_2)

# The claim is that Born December 30, 1974, William Frick was a dark horse candidate
    in the Maryland House of Delegates appointment process.
def program ():
    fact_1 = Verify("William Frick was born in December 30, 1974.")
    fact_2 = Verify("William Frick was a dark horse candidate in the Maryland House
    of Delegates appointment process.")
    label = Predict(fact_1 and fact_2)

# The claim is that <input_claim>
def program ():
```

FIG. 12 (Cont'd)

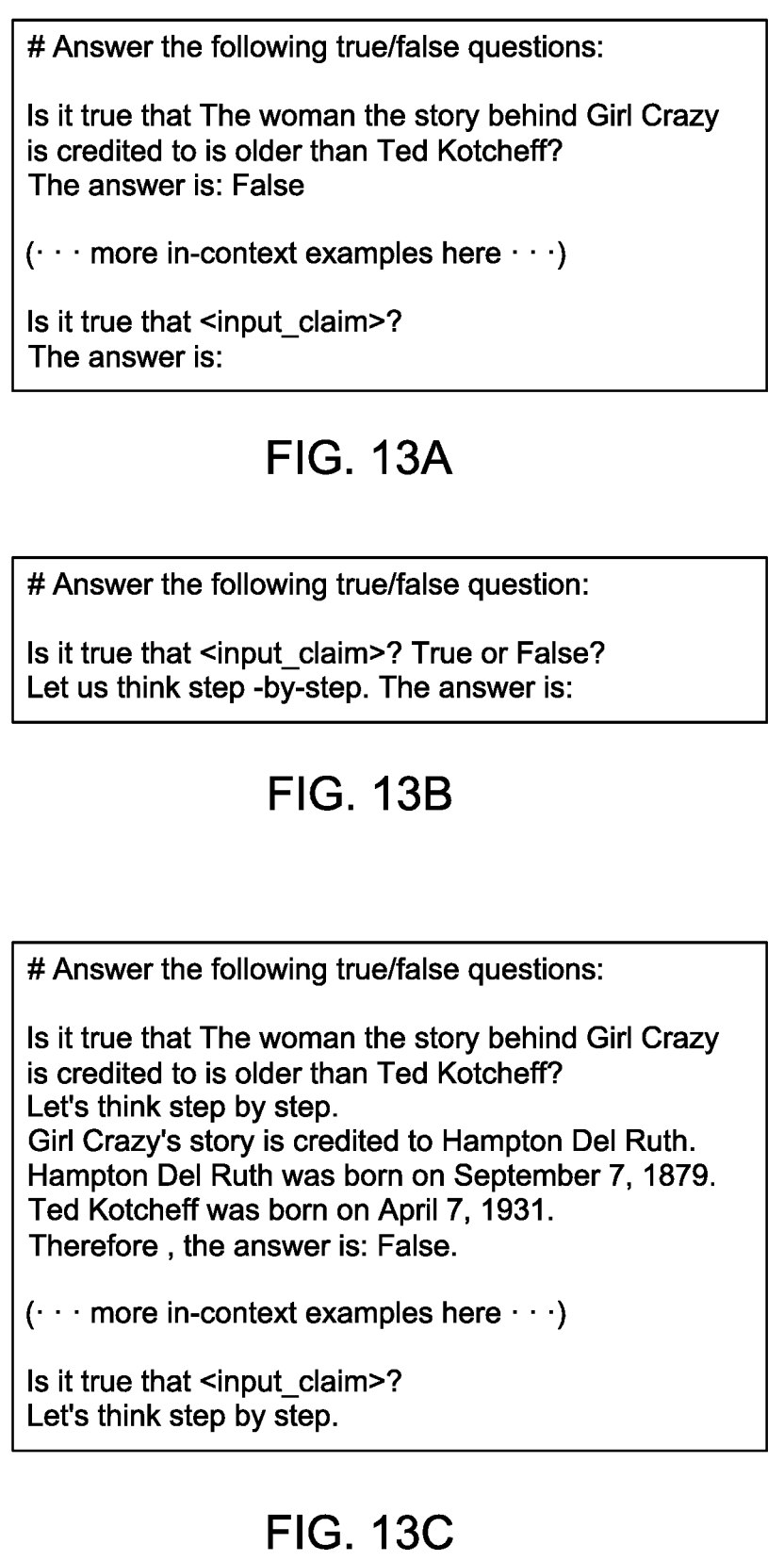

Answer the following true/false questions:

Is it true that The woman the story behind Girl Crazy
is credited to is older than Ted Kotcheff?
The answer is: False (· · · more in-context examples here · · ·)

Is it true that \<input_claim\>?
The answer is:

FIG. 13A

Answer the following true/false question:

Is it true that \<input_claim\>? True or False?
Let us think step -by-step. The answer is:

FIG. 13B

Answer the following true/false questions:

Is it true that The woman the story behind Girl Crazy
is credited to is older than Ted Kotcheff?
Let's think step by step.
Girl Crazy's story is credited to Hampton Del Ruth.
Hampton Del Ruth was born on September 7, 1879.
Ted Kotcheff was born on April 7, 1931.
Therefore , the answer is: False.

(· · · more in-context examples here · · ·)

Is it true that \<input_claim\>?
Let's think step by step.

FIG. 13C

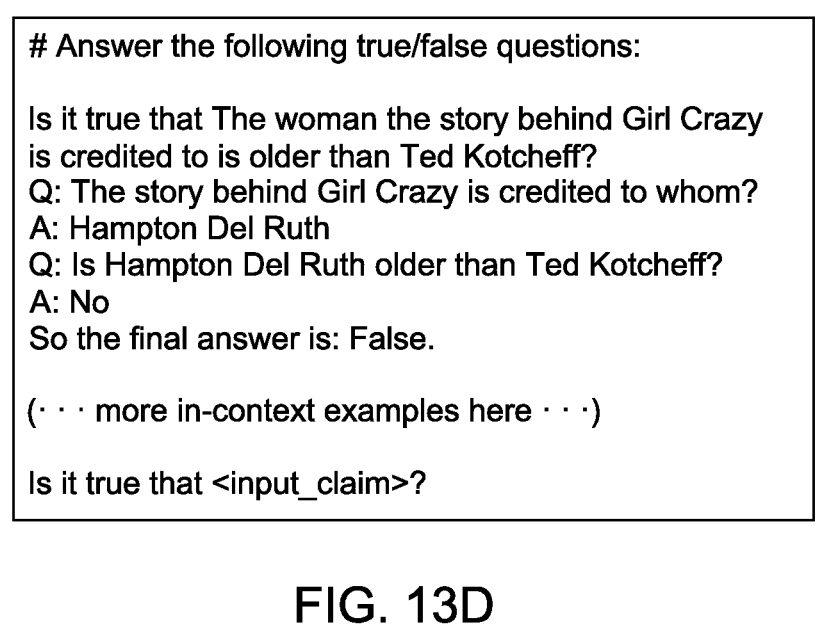

Answer the following true/false questions:

Is it true that The woman the story behind Girl Crazy is credited to is older than Ted Kotcheff?
Q: The story behind Girl Crazy is credited to whom?
A: Hampton Del Ruth
Q: Is Hampton Del Ruth older than Ted Kotcheff?
A: No
So the final answer is: False.

(· · · more in-context examples here · · ·)

Is it true that <input_claim>?

FIG. 13D

SYSTEM AND METHOD FOR FACT-CHECKING COMPLEX CLAIMS WITH PROGRAM-GUIDED REASONING

STATEMENT REGARDING PRIOR DISCLOSURE BY THE INVENTORS

Aspects of this technology are described in Pan, Liangming, Xiaobao Wu, Xinyuan Lu, Anh Tuan Luu, William Yang Wang, Min-Yen Kan, and Preslav Nakov. "Fact-Checking Complex Claims with Program-Guided Reasoning." *arXiv preprint arXiv:* 2305.12744 (2023), which is incorporated herein by reference in its entirety. The program code and the data are available at: github.com/mbzuai-nlp/ProgramFC.

BACKGROUND

Technical Field

A system, computer program product and method for fact-checking that decomposes complex claims, with two or more claims, into simpler sub-tasks that can be solved using a shared library of specialized functions.

Description of Related Art

The proliferation of disinformation, e.g., in social media, has made automated fact-checking a crucial application of natural language processing (NLP). A claim is an assertion of the truth of something, typically one that is disputed or in doubt. Veracity is conformity to facts, accuracy. Given a claim, the goal is to find evidence and then to make a verdict about the claim's veracity based on that evidence. See James Thorne and Andreas Vlachos. 2018. Automated fact checking: Task formulations, methods and future directions. In *Proceedings of the 27th International Conference on Computational Linguistics (COLING)*, pages 3346-3359, Santa Fe, New Mexico, USA; Max Glockner, Yufang Hou, and Iryna Gurevych. 2022. Missing counter-evidence renders NLP fact-checking unrealistic for misinformation. In *Proceedings of the 2022 Conference on Empirical Methods in Natural Language Processing (EMNLP)*, pages 5916-5936, Abu Dhabi, United Arab Emirates; and Zhijiang Guo, Michael Schlichtkrull, and Andreas Vlachos. 2022. A survey on automated fact-checking. *Transactions of the Association for Computational Linguistics,* 10:178-206.

Evaluating the veracity of real-world claims often involves collecting multiple pieces of evidence and applying complex reasoning. See Yichen Jiang, Shikha Bordia, Zheng Zhong, Charles Dognin, Maneesh Singh, and Mohit Bansal. 2020. HoVer: A dataset for many-hop fact extraction and claim verification. In *Findings of the Association for Computational Linguistics: EMNLP* 2020, pages 3441-3460, Online; Van-Hoang Nguyen, Kazunari Sugiyama, Preslav Nakov, and Min-Yen Kan. 2020. FANG: leveraging social context for fake news detection using graph representation. In *Proceedings of the 29th ACM International Conference on Information and Knowledge Management (CIKM)*, pages 1165-1174; Rami Aly and Andreas Vlachos. 2022. Natural logic-guided autoregressive multi-hop document retrieval for fact verification. In *Proceedings of the 2022 Conference on Empirical Methods in Natural Language Processing (EMNLP)*, pages 6123-6135, Abu Dhabi, United Arab Emirates; and Jifan Chen, Aniruddh Sriram, Eunsol Choi, and Greg Durrett. 2022a. Generating literal and implied subquestions to fact-check complex claims. In *Proceedings of*

*the* 2022 *Conference on Empirical Methods in Natural Language Processing (EMNLP)*, pages 3495-3516, Abu Dhabi, United Arab Emirates. For instance, consider the complex claim "Both James Cameron and the director of the film Interstellar were born in Canada". It may be challenging to find direct evidence on the web that refutes or supports this complex claim.

Instead, a human fact-checker needs to decompose the complex claim, gather multiple pieces of evidence, and perform step-by-step reasoning, as illustrated in FIG. 1. See Preslav Nakov, David Corney, Maram Hasanain, Firoj Alam, Tamer Elsayed, Alberto Barrón-Cedeño, Paolo Papotti, Shaden Shaar, and Giovanni Da San Martino. 2021a. Automated fact-checking for assisting human fact-checkers. In *Proceedings of the Joint Conference on Artificial Intelligence (IJCAI)*, pages 4551-4558, Online. This makes verifying complex claims much more challenging than the typical setting explored in previous work, where information from a single article is sufficient to support/refute the claim. See James Thorne, Andreas Vlachos, Christos Christodoulopoulos, and Arpit Mittal. 2018. FEVER: a large-scale dataset for fact extraction and VERification. In *Proceedings of the 2018 Conference of the North American Chapter of the Association for Computational Linguistics: Human Language Technologies (NAACL-HLT)*, pages 809-819, New Orleans, Louisiana; Arkadiy Saakyan, Tuhin Chakrabarty, and Smaranda Muresan. 2021. COVID-fact: Fact extraction and verification of real-world claims on COVID-19 pandemic. In *Proceedings of the 59th Annual Meeting of the Association for Computational Linguistics and the 11th International Joint Conference on Natural Language Processing (ACL-IJCNLP)*, pages 2116-2129, Online; Tal Schuster, Adam Fisch, and Regina Barzilay. 2021. Get your vitamin C! robust fact verification with contrastive evidence. In *Proceedings of the 2021 Conference of the North American Chapter of the Association for Computational Linguistics: Human Language Technologies (NAACL-HLT)*, pages 624-643, Online; Liangming Pan, Wenhu Chen, Wenhan Xiong, Min-Yen Kan, and William Yang Wang. 2021. Zeroshot fact verification by claim generation. In *Proceedings of the 59th Annual Meeting of the Association for Computational Linguistics and the 11th International Joint Conference on Natural Language Processing (ACL-IJCNLP)*, pages 476-483, Online; David Wadden, Kyle Lo, Bailey Kuehl, Arman Cohan, Iz Beltagy, Lucy Lu Wang, and Hannaneh Hajishirzi. 2022a. SciFact-open: Towards opendomain scientific claim verification. In *Findings of the Association for Computational Linguistics: EMNLP* 2022, pages 4719-4734, Abu Dhabi, United Arab Emirates; and Amrith Krishna, Sebastian Riedel, and Andreas Vlachos. 2022. ProoFVer: Natural logic theorem proving for fact verification. *Transactions of the Association for Computational Linguistics (TACL)*, 10:1013-1030.

Besides multi-step reasoning, two key aspects for developing a reliable fact-checking system are to be considered: (i) Explainability: The model should not only predict the veracity of the claim, but it should also provide a clear explanation of its reasoning process to help users understand and trust the results. (ii) Data efficiency: Human annotation is often time-consuming, costly, and potentially biased, making it difficult to collect sufficient high-quality labeled data for model training, particularly for complex claims. Therefore, it is desirable to build a model that can perform well with minimal or no training data. Despite a few models being proposed to facilitate multi-step reasoning in fact-checking, they either lack explainability in their reasoning process or require a large number of task-specific training examples. See Jie Zhou, Xu Han, Cheng Yang, Zhiyuan Liu, Lifeng Wang, Changcheng Li, and Maosong Sun. 2019. GEAR: Graph-based evidence aggregating and reasoning for fact verification. In *Proceedings of the 57th Annual Meeting of the Association for Computational Linguistics (ACL)*, pages 892-901, Florence, Italy; Wanjun Zhong, Jingjing Xu, Duyu Tang, Zenan Xu, Nan Duan, Ming Zhou, Jiahai Wang, and Jian Yin. 2020. Reasoning over semantic-level graph for fact checking. In *Proceedings of the 58th Annual Meeting of the Association for Computational Linguistics (ACL)*, pages 6170-6180, Online; and Aly and Vlachos, 2022.

Fact-Checking. Automated fact-checking has gained significant attention in the NLP research community in recent years as a means of combating misinformation and disinformation. Various datasets have been proposed that enable the development and the evaluation of systems for automatic fact-checking, the most popular ones being based on human-crafted claims from Wikipedia content and naturally occurring claims in the political or in the scientific domain. See Thorne et al., 2018; Aalok Sathe, Salar Ather, Tuan Manh Le, Nathan Perry, and Joonsuk Park. 2020. Automated fact-checking of claims from Wikipedia. In *Proceedings of the Twelfth Language Resources and Evaluation Conference (LREC)*, pages 6874-6882, Marseille, France; Schuster et al., 2021; William Yang Wang. 2017. "Liar, liar pants on fire": A new benchmark dataset for fake news detection. In *Proceedings of the 55th Annual Meeting of the Association for Computational Linguistics (ACL)*, pages 422-426, Vancouver, Canada; Preslav Nakov, Giovanni Da San Martino, Tamer Elsayed, Alberto Barrón-Cedeño, Rubén Míguez, Shaden Shaar, Firoj Alam, Fatima Haouari, Maram Hasanain, Nikolay Babulkov, Alex Nikolov, Gautam Kishore Shahi, Julia Maria Struß, and Thomas Mandl. 2021b. The CLEF-2021 CheckThat! Lab on detecting check-worthy claims, previously fact-checked claims, and fake news. In *Proceedings of the 43rd European Conference on Information Retrieval (ECIR)*, pages 639-649, Lucca, Italy; Preslav Nakov, Alberto Barrón-Cedeño, Giovanni Da San Martino, Firoj Alam, Julia Maria Struß, Thomas Mandl, Rubén Míguez, Tommaso Caselli, Mucahid Kutlu, Wajdi Zaghouani, Chengkai Li, Shaden Shaar, Gautam Kishore Shahi, Hamdy Mubarak, Alex Nikolov, Nikolay Babulkov, Yavuz Selim Kartal, and Javier Beltrán. 2022. The CLEF-2022 CheckThat! lab on fighting the COVID-19 infodemic and fake news detection. In *Proceedings of the 44th European Conference on IR Research: Advances in Information Retrieval (ECIR)*, pages 416-428, Berlin, Heidelberg; Isabelle Augenstein, Christina Lioma, Dongsheng Wang, Lucas Chaves Lima, Casper Hansen, Christian Hansen, and Jakob Grue Simonsen. 2019. MultiFC: A real-world multi-domain dataset for evidence-based fact checking of claims. In *Proceedings of the* 2019 *Conference on Empirical Methods in Natural Language Processing and the 9th International Joint Conference on Natural Language Processing (EMNLP-IJCNLP)*, pages 4685-4697, Hong Kong, China; Saakyan et al., 2021; Ashim Gupta and Vivek Srikumar. 2021. X-Fact: A new benchmark dataset for multilingual fact checking. In *Proceedings of the 59th Annual Meeting of the Association for Computational Linguistics and the 11th International Joint Conference on Natural Language Processing (ACL-IJCNLP)*, pages 675-682, Online; David Wadden, Shanchuan Lin, Kyle Lo, Lucy Lu Wang, Madeleine van Zuylen, Arman Cohan, and Hannaneh Hajishirzi. 2020. Fact or fiction: Verifying scientific claims. In *Proceedings of the* 2020 *Conference on Empirical Methods in Natural Language Processing (EMNLP)*, pages 7534-7550, Online;

and Wadden et al., 2022a. Notably, most of these datasets are constructed in a way that the evidence to support or to refute a claim can be found in a single document. For example, in FEVER, more than 87% of the claims only require information from a single Wikipedia article. See Thorne et al., 2018; and Jiang et al., 2020.

To bridge this gap, datasets have been proposed to study fact-checking complex claims that require multi-step reasoning. See Jiang et al., 2020; and Aly et al., 2021. Graph-based models are used to facilitate the reasoning over multiple pieces of evidence. See Zhou et al., 2019; Zhenghao Liu, Chenyan Xiong, Maosong Sun, and Zhiyuan Liu. 2020. Fine-grained fact verification with kernel graph attention network. In *Proceedings of the 58th Annual Meeting of the Association for Computational Linguistics (ACL)*, pages 7342-7351, Online; Zhong et al., 2020; Nguyen et al., 2020; and Giorgio Barnabò, Federico Siciliano, Carlos Castillo, Stefano Leonardi, Preslav Nakov, Giovanni Da San Martino, and Fabrizio Silvestri. 2022. FbMultiLingMisinfo: Challenging large-scale multilingual benchmark for misinformation detection. In *Proceedings of the 2022 International Joint Conference on Neural Networks (IJCNN)*, pages 1-8, Padova, Italy; and Giorgio Barnabò, Federico Siciliano, Carlos Castillo, Stefano Leonardi, Preslav Nakov, Giovanni Da San Martino, and Fabrizio Silvestri. 2023. Deep active learning for misinformation detection using geometric deep learning. *Online Social Networks and Media*, 33:100244. Although such models achieve sizable performance gains, they lack explainability and they rely on large amounts of training data.

Explanation Generation

Facing the complexities of real-world claims, simply giving a final veracity to a claim often fails to be persuasive. See Guo et al., 2022. Previous research has proposed various approaches to provide post-hoc explanations for model predictions, such as using attention weights to highlight relevant parts of the evidence, generating justifications with logic-based systems based on knowledge graphs, and generating a summary of the retrieved relevant evidence. See Kashyap Popat, Subhabrata Mukherjee, Jannik Strötgen, and Gerhard Weikum. 2017. Where the truth lies: Explaining the credibility of emerging claims on the web and social media. In *Proceedings of the International World Wide Web Conference (WWW)*, pages 1003-1012; Limeng Cui, Kai Shu, Suhang Wang, Dongwon Lee, and Huan Liu. 2019. dEFEND: A system for explainable fake news detection. In *Proceedings of the 28th ACM International Conference on Information and Knowledge Management (CIKM)*, pages 2961-2964, Beijing, China; Fan Yang, Shiva K. Pentyala, Sina Mohseni, Mengnan Du, Hao Yuan, Rhema Linder, Eric D. Ragan, Shuiwang Ji, and Xia (Ben) Hu. 2019. XFake: Explainable fake news detector with visualizations. In *Proceedings of the The World Wide Web Conference (WWW)*, pages 3600-3604, San Francisco, California, USA; Yi-Ju Lu and Cheng-Te Li. 2020. GCAN: Graph-aware co-attention networks for explainable fake news detection on social media. In *Proceedings of the 58th Annual Meeting of the Association for Computational Linguistics (ACL)*, pages 505-514, Online; Mohamed H. Gad-Elrab, Daria Stepanova, Jacopo Urbani, and Gerhard Weikum. 2019. Exfakt: A framework for explaining facts over knowledge graphs and text. In *Proceedings of the Twelfth ACM International Conference on Web Search and Data Mining (WSDM)*, pages 87-95, Melbourne, Australia; Naser Ahmadi, Joohyung Lee, Paolo Papotti, and Mohammed Saeed. 2019.

Explainable fact checking with probabilistic answer set programming. In *Proceedings of the Truth and Trust Online Conference (TTO)*, London, UK; Pepa Atanasova, Jakob Grue Simonsen, Christina Lioma, and Isabelle Augenstein. 2020. Generating fact checking explanations. In *Proceedings of the 58th Annual Meeting of the Association for Computational Linguistics (ACL)*, pages 7352-7364, Online; Neema Kotonya and Francesca Toni. 2020. Explainable automated fact-checking for public health claims. In *Proceedings of the* 2020 *Conference on Empirical Methods in Natural Language Processing (EMNLP)*, pages 7740-7754, Online; and Shailza Jolly, Pepa Atanasova, and Isabelle Augenstein. 2022. Generating fluent fact checking explanations with unsupervised post-editing. *Information,* 13 (10): 500.

Chain-of-Thought Reasoning

Moreover, unlike previous work that generates post-hoc explanations, reasoning programs can be used as guidance for predicting the veracity of the claim. This is motivated by the recent success of chain-of-thought prompting (CoT), which generates step-by-step natural language reasoning steps to guide the model in answering complex questions. See Jason Wei, Xuezhi Wang, Dale Schuurmans, Maarten Bosma, Ed H. Chi, Quoc Le, and Denny Zhou. 2022. Chain of thought prompting elicits reasoning in large language models. *ArXiv preprint*, abs/2201.11903; Takeshi Kojima, Shixiang Shane Gu, Machel Reid, Yutaka Matsuo, and Yusuke Iwasawa. 2022. Large language models are zero-shot reasoners. *CoRR*, abs/2205.11916; and Xuezhi Wang, Jason Wei, Dale Schuurmans, Quoc V. Le, Ed H. Chi, and Denny Zhou. 2022. Self-consistency improves chain of thought reasoning in language models. *CoRR*, abs/2203.11171.

An approach to program-guided reasoning that delegates to a sub-task reduces the burden on the language model and allows for more flexibility in incorporating necessary components for factchecking such as an evidence retriever. The strategy of program-guided reasoning is also in line with the recent trend of tool-augmented language models, i.e., augmenting language models with access to external tools and resources. See Grégoire Mialon, Roberto Dessì, Maria Lomeli, Christoforos Nalmpantis, Ramakanth Pasunuru, Roberta Raileanu, Baptiste Rozière, Timo Schick, Jane Dwivedi-Yu, Asli Celikyilmaz, Edouard Grave, Yann LeCun, and Thomas Scialom. 2023. Augmented language models: a survey. *CoRR*, abs/2302.07842; and Timo Schick, Jane Dwivedi-Yu, Roberto Dessì, Roberta Raileanu, Maria Lomeli, Luke Zettlemoyer, Nicola Cancedda, and Thomas Scialom. 2023. Toolformer: Language models can teach themselves to use tools. *CoRR*, abs/2302.04761.

Each of the aforementioned techniques suffers from a lack of clear explanation of reasoning and/or requires a large amount of training data.

Accordingly, it is one object of the present disclosure to provide methods and systems for fact-checking complex claims. Unlike the original CoT, which uses a single LLM for both decomposition and question answering, an object is a language model used only to generate reasoning programs as the blueprint for problem-solving. A further object is to delegate each sub-task to specialized functions.

It is an object of the present disclosure to describe a system and method that provides a fact-checking framework that is both explanatory and data efficient. An object is an explainable, flexible, and data-efficient model that generates reasoning graphs as explanations and utilizes in-context learning to enable few-shot learning. An object of the present disclosure are reasoning programs to provide explanations that consist of sub-tasks described in a program-like natural language. This allows for explanations that are not confined to the evidence, like attention weights, is more flexible than logic-based explanations, and is more concise than free-form summarization.

SUMMARY

An aspect of the present disclosure is a system for fact checking electronically posted claims, that can include an input/output device for inputting a textual complex claim as a natural language statement with a combination of two or more facts and outputting an indication that the textual complex claim is true or false; and processing circuitry configured to generate, by a program generation module, a reasoning program for the input complex claim as a sequence of reasoning steps, where each step directs to a function in a set of sub-task functions, and delegate, by a program execution module, each step in the reasoning program to a respective sub-task function and executing the respective sub-task function in order to provide the outputted indication.

A further aspect of the present disclosure is a non-transitory computer-readable storage medium including computer executable instructions, wherein the instructions are a framework including a program generation module and a program execution module, which when executed by a computer, cause the computer to perform a method for fact checking electronically posted claims, the method comprising: inputting a textual complex claim as a natural language statement with a combination of two or more facts; generating, by the program generation module, a reasoning program having at least one program step for the input complex claim as a sequence of reasoning steps, where each program step directs to a function in a set of sub-task functions; delegating, by the program execution module, each step in the reasoning program to a respective sub-task function and executing the respective sub-task function; outputting, as a result of the reasoning program, an indication that the textual complex claim is true or false.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is an exemplary template used to generate reasoning programs, in accordance with an exemplary aspect of the disclosure;

FIG. 5 is a flow diagram of a question-answering sub-task function, in accordance with an exemplary aspect of the disclosure;

FIG. 8 is a sample error case from the HOVER 4-hop dataset;

FIG. 9 are examples of generated reasoning programs;

FIGS. 10A-10C are examples of erroneous cases where the generated reasoning programs are incorrect;

FIG. 11 are exemplary prompts for program generation for the HOVER dataset;

FIG. 12 are exemplary prompts for program generation for the FEVEROUS-S dataset;

FIGS. 13A-13D are exemplary templates for prompting methods for the closed-book fact-checking setting.

DETAILED DESCRIPTION

Figure 1:
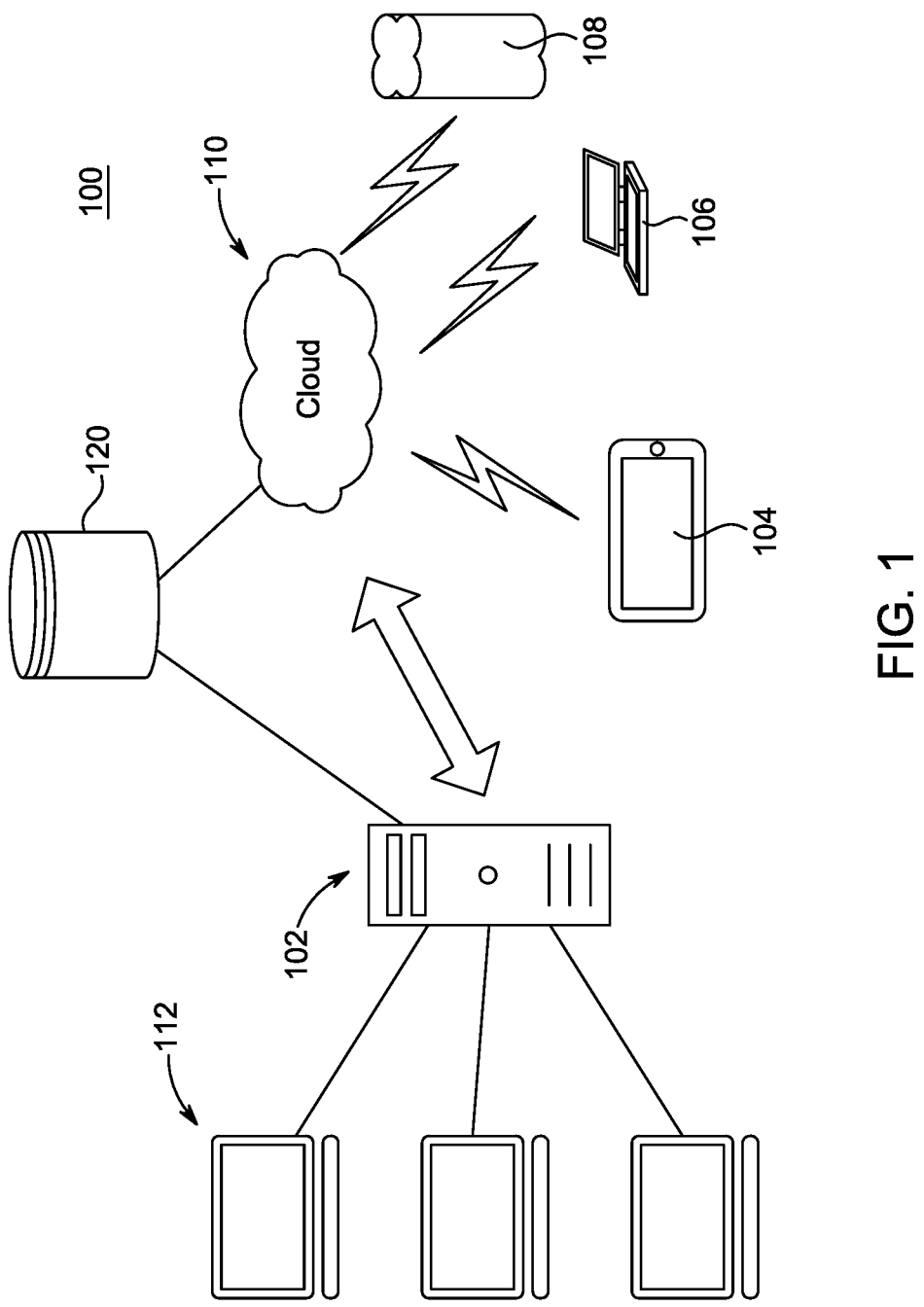
FIG. 1 is a diagram of a machine learning system in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, apparatus, and method for a fact-checking framework that is both explanatory and data-efficient. The system and method decompose complex claims into simpler sub-tasks that can be solved using a shared library of specialized functions. The system and method use a large language model to generate a reasoning program to guide the verification process. The system and method then executes the reasoning program by delegating each sub-task to the corresponding sub-task handler. The return value of the last reasoning step must be a Boolean value indicating the veracity label of the claim C, i.e., $V_n$ is a member of {TRUE, FALSE}.

The present disclosure addresses a need of members of modern society, particularly those individuals engaged in social media or otherwise having a presence online. Persons may come across statements in articles, in social media, television program, etc., that they may question whether the statement is supported by fact, i.e., is true. The platform for making these statements may include the Web, mobile apps, television program streaming services. Also, students and researchers may need to find support for statements. In each case, the person would preferably have a convenient and readily accessible medium for checking a statement, herein referred to as a claim.

FIG. 1 is a diagram of a machine learning system in accordance with an exemplary aspect of the disclosure. In an exemplary embodiment, a machine learning system 100 is provided not only for training a machine learning model for claim checking, but also to provide a user with a convenient and readily available access to a claim checking system. In the exemplary embodiment, a server 102 or artificial intelligence (AI) workstation may be configured for training a fact checking model. With such a configuration, one or more client computers 112 may be used to perform training of fact checking models for several claims at a time. In the embodiment, the server 102 may be connected to a cloud service 110. The cloud service 110 may be accessible via the Internet. The cloud service 110 may provide a database system and may store evidence and training prompts for the machine learning system 100. The cloud service 110 may be configured with fact checking models that can take claims as input and return an indication that the claim is true or false. The fact checking models can also return explanations for the resulting claim veracity. Mobile devices 104, 106 may submit claims to the cloud service 110 and display an indication of whether a claim is true or false.

The indication may include a graphical icon displayed adjacent to the claim that shows a thumb-up icon or a thumb-down, for true or false, respectively. Other graphical indications can include, but are not limited to, a sad emoji and a happy emoji, a red x-mark encircled, green check mark, to name a few.

A smart speaker 108 can output an audio message as an indication that a claim is true or false. For example, a user of the smart speaker 108 may say a claim and ask whether the claim is true or false. The smart speaker 108 can output a verbal response that indicates that the claim is true or false. The smart speaker 108 can output a verbal explanation of the claim veracity, or forward a graphical-based explanation to a display device associated with the smart speaker.

An aspect is a fact checking service having one or more servers 102 and one or more client computers 112. The fact checking service can determine whether a claim is true and take appropriate action, such as insert a label that indicates that the claim has been determined as being true or false.

Another aspect is a fact checking software application that any user of a display device will be made aware that a claim is true or false, or may be provided with a list of claims, downloaded, or stored, that the application has determined to be true or false. The fact checking software application may be configured to run in the background as a daemon, or be configured to be invoked by a command and/or function associated with a graphical widget. In addition, claims that have been determined as true or false may be stored in a database 120 containing claims together with a label. The database 120 may be maintained in a server computer or in a cloud service 110.

In some embodiments, a fact checking service may include a fact checking system of the present disclosure. The fact check service may be setup to label claims as being true or false, store claims in a separate distribution channel, or other action under the discretion of the fact checking service.

In some embodiments, the fact checking system of the present disclosure may take the form of a product, such as a fact checking device or software application (a program stored on a computer readable storage medium). The fact checking device or software application may be connected to a claim uploading service 110 and may capture claims distributed by the claims uploading service in order to determine if a claim is true or false. The fact checking device or software application may be incorporated into a network system as middleware that is connected between a claim uploading service 110 and an end user device 104, 106, 108. Claims that are detected as being true or false may be subjected to a follow-up action, such as inserting a label into the claim as an indication that it has been detected as being true or false. Another action may be to redirect those claims detected as being true or false into a database 120 to store the claims, for example, to be further analyzed, or separately distributed in a claim channel.

In some embodiments, a fact checking detector may be a mobile application that can be installed in a mobile display device 104, 106, or as an application for a smart speaker 108. The fact checking detector mobile application may inform the user of the mobile display device that a claim is a true or false, by for example, displaying an indication message, or outputting an audio sound or voice message, in order to make the user aware that a claim has been detected as being true or false. The smart speaker 108 may be configured to receive a request for claim veracity by way of a spoken statement, and return a response in the form of a verbal claim veracity. The smart speaker 108 may have an associated display device to which the response can be displayed, as well as a visual explanation for the claim veracity.

Figure 2:
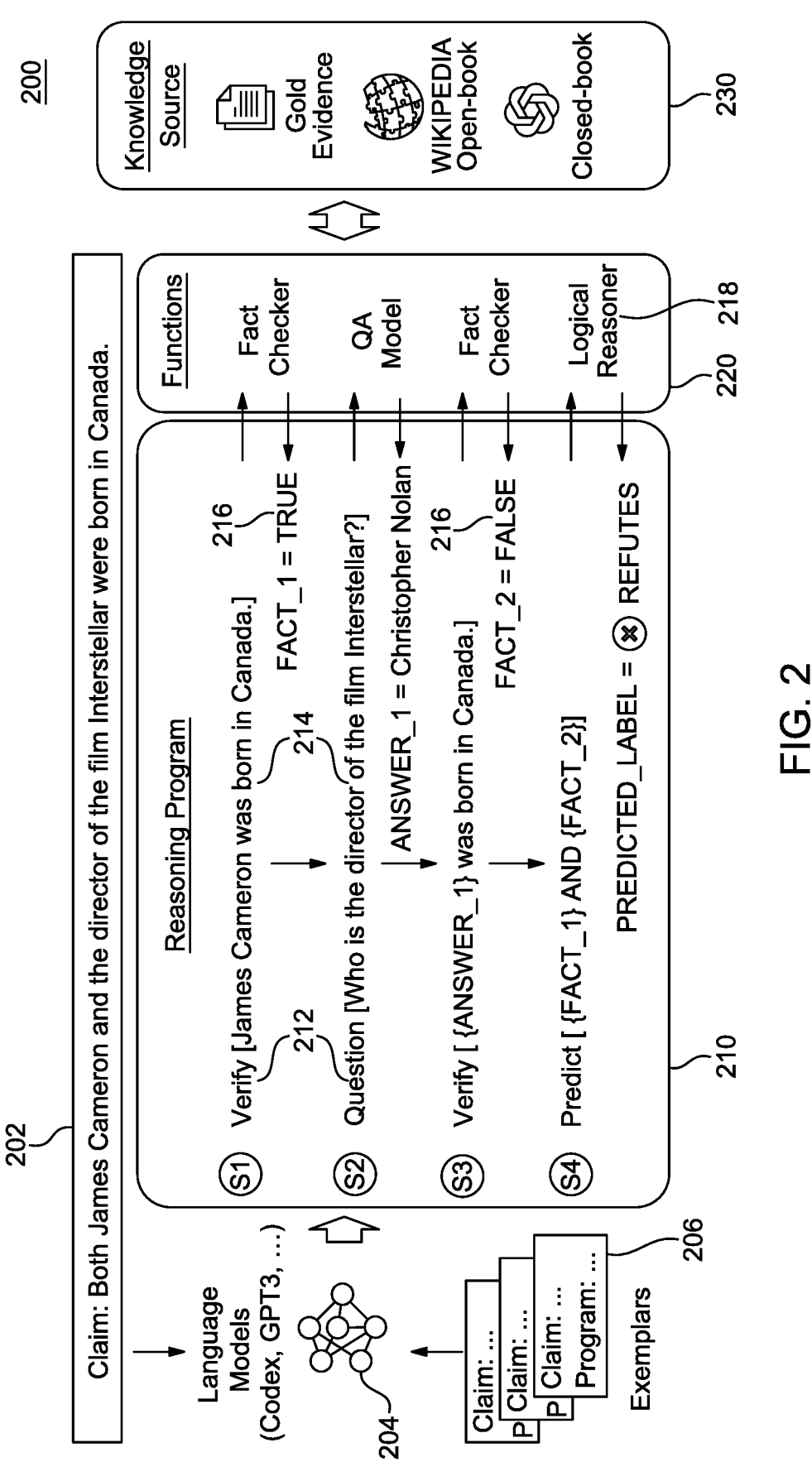
FIG. 2 is a flow diagram for the fact-checking model, in accordance with an exemplary aspect of the disclosure.

FIG. 2 is a flow diagram of the fact checking software modules. The Program-Guided Fact Checking (hereinafter referred to as PROGRAMFC) framework consists of two modules: (i) Program Generation module 204 generates a reasoning program for the input claim using Codex with in-context learning, and then (ii) Program Execution module sequentially interprets the program by delegating each step to the corresponding sub-task function.

Complex claims are statements with more than one claim. A complex claim may have a part that is true and another part that is false. To verify complex claims, PROGRAMFC decomposes them into their parts. Each part of a claim involves simpler sub-tasks that can be solved using a shared library of specialized sub-task functions. To be specific, PROGRAMFC begins by generating a reasoning program for the input claim, which is a sequence of sub-tasks (e.g., S1-S4 in FIG. 2) in the form of ACTION[ARGUMENT], where ACTION and ARGUMENT define the type and the content of the sub-task, respectively. As illustrated in FIG. 2, "Verify" is an action and "James Cameron was born in Canada" is an argument. Other actions shown in FIG. 2 include Question and Predict.

The generated reasoning program 210 serves as a step-by-step guide for verifying the claim. The program sequentially delegates each sub-task to the corresponding sub-task handler, as shown in the functions column 220 in FIG. 2. These sub-tasks may include answering questions, verifying simple claims, or conducting logical reasoning 218.

PROGRAMFC combines explainability with data efficiency. It uses reasoning programs to provide clear explanations of its reasoning process. For data efficiency, Large Language Models (LLMs) can solve various tasks given only a few examples as prompts, e.g., in-context learning. See Tom B. Brown, Benjamin Mann, Nick Ryder, Melanie Subbiah, Jared Kaplan, Prafulla Dhariwal, Arvind Neelakantan, Pranav Shyam, Girish Sastry, Amanda Askell, Sandhini Agarwal, Ariel Herbert-Voss, Gretchen Krueger, Tom Henighan, Rewon Child, Aditya Ramesh, Daniel M. Ziegler, Jeffrey Wu, Clemens Winter, Christopher Hesse, Mark Chen, Eric Sigler, Mateusz Litwin, Scott Gray, Benjamin Chess, Jack Clark, Christopher Berner, Sam McCandlish, Alec Radford, Ilya Sutskever, and Dario Amodei. 2020. Language models are few-shot learners. In *Proceedings of the Annual Conference on Neural Information Processing Systems (NeurIPS)*, Online, each incorporated herein by reference in its entirety. LLMs generate reasoning programs for a given claim by showing the model just a few dozen of (claim, program) pairs 206 as demonstrations. PROGRAMFC is also flexible as it allows for easy swapping of subtask function implementations to work under different settings of fact-checking, without affecting the rest of the system. The functions 220 retrieve information from external knowledge sources 230 (in an open-book setting) or generate answers based solely on the LLM's internal parametric knowledge (in a closed-book setting).

PROGRAMFC can be used on two challenging datasets designed for fact-checking complex claims: HOVER and FEVEROUS, and it can be shown that PROGRAMFC outperforms seven few-shot fact-checking baselines on both datasets (§ 4.1). See Jiang et al., 2020; and Rami Aly, Zhijiang Guo, Michael Sejr Schlichtkrull, James Thorne, Andreas Vlachos, Christos Christodoulopoulos, Oana Cocarascu, and Arpit Mittal. 2021. FEVEROUS: Fact Extraction and VERification Over Unstructured and Structured information. In Proceedings of the Neural Information Processing Systems (NeurIPS) Track on Datasets and Benchmarks, Online, each incorporated herein by reference in their entirety.

The strategy of program-guided reasoning becomes increasingly effective as the required reasoning depth increases. In the open-domain setting, reasoning programs can enhance the retrieval of relevant evidence from knowledge sources. Moreover, PROGRAMFC is robust even when weak models are used as sub-task solvers. The interpretability of the reasoning programs is evaluated through human evaluation and error analysis.

PROGRAMFC

The architecture of fact-checking is introduced and a model for Program-Guided Fact-Checking (PROGRAMFC) is described.

1. Problem Formulation

Given a claim C, a fact-checking model $\mathcal{F}$ aims to predict a label Y to evaluate the claim as TRUE or FALSE, based on a knowledge source $\mathcal{K}$. The model is also required to output an explanation E to justify the predicted veracity label. There are three different settings of fact-checking depending on the type of knowledge source $\mathcal{K}$.

Gold evidence: For each claim, $\mathcal{K}$ is the set of gold evidence documents that can support or refute the claim. This setting is also called claim verification. See Pan et al., 2021; Dustin Wright, David Wadden, Kyle Lo, Bailey Kuehl, Arman Cohan, Isabelle Augenstein, and Lucy Wang. 2022. Generating scientific claims for zero-shot scientific fact checking. In *Proceedings of the 60th Annual Meeting of the Association for Computational Linguistics (ACL)*, pages 2448-2460, Dublin, Ireland, each incorporated herein by reference in their entirety.

Open-book setting: $\mathcal{K}$ is a large textual corpus such as Wikipedia. The model first retrieves relevant evidence from the corpus and then predicts the veracity label based on the evidence. See Kelvin Jiang, Ronak Pradeep, and Jimmy Lin. 2021. Exploring listwise evidence reasoning with T5 for fact verification. In *Proceedings of the 59th Annual Meeting of the Association for Computational Linguistics and the 11th International Joint Conference on Natural Language Processing (ACL-IJCNLP)*, pages 402-410, Online; and David Wadden, Kyle Lo, Lucy Wang, Arman Cohan, Iz Beltagy, and Hannaneh Hajishirzi. 2022b. MultiVerS: Improving scientific claim verification with weak supervision and full-document context. In *Findings of the Association for Computational Linguistics: NAACL 2022*, pages 61-76, Seattle, Washington, USA, each incorporated herein by reference in their entirety.

Closed-book setting: The model does not have access to any external knowledge source ($\mathcal{K} = \emptyset$). It needs to leverage the knowledge stored in its parameters (acquired during pre-training and fine-tuning) to verify the claim. This setting was explored in work that applies large language models for fact-checking. See Nayeon Lee, Belinda Z. Li, Sinong Wang, Wen-tau Yih, Hao Ma, and Madian Khabsa. 2020. Language models as fact checkers? In *Proceedings of the Third Workshop on Fact Extraction and VERification (FEVER)*, pages 36-41, Online; and Nayeon Lee, Yejin Bang, Andrea Madotto, and Pascale Fung. 2021. Towards few-shot fact-checking via perplexity. In *Proceedings of the 2021*

*Conference of the North American Chapter of the Associa-tion for Computational Linguistics: Human Language Tech-nologies* (*NAACL-HLT*), pages 1971-1981, Online, each incorporated herein by reference in their entirety.

2. Program-Guided Reasoning

A goal is to fact-check a complex claim C that requires multi-step reasoning. A focus is on the few-shot setting, where only a small set of in-domain examples are available to teach the model. To solve this, PROGRAMFC follows a program generation-and-execution paradigm, as shown in FIG. 2.

Program Generation. At this stage, given the input claim C 202, a planner $\mathcal{P}$ generates a reasoning program P=[S$_1$, . . . S$_n$] 210 for it, which consists of n sequentially ordered reasoning steps S$_i$.

Each reasoning step S$_i\in$P is an instruction in controlled natural language that directs S$_i$ to a function in an auxiliary set of sub-task functions $\mathcal{F}$ available to the system. To be specific, define S$_i$=($f_i$, A$_i$, V$_i$), where $f_i$ specifies the sub-task function $f_i\in\mathcal{F}$, A$_i$ is the argument passed to the function $f_i$, and V$_i$ is the variable that stores the returned result from the function call $f_i$(A$_i$). For a valid reasoning program, the return value of the last reasoning step must be a Boolean value indicating the veracity label of the claim C, i.e., V$_n\in$ {TRUE, FALSE}.

Program Execution. In the execution stage, the reasoning program P 210 is run by an interpreter to derive the veracity label of the claim C 202. The interpreter sequentially parses the reasoning steps in P 210. For each step S$_i$=($f_i$, A$_i$, V$_i$), the reasoning program 210 calls the corresponding off-the-shelf sub-task function $f_i$ 220 and passes the argument A$_i$, 214 in brackets, to it. The argument A$_i$ is either a logical expression or a natural language sentence, e.g., a question or a simple claim. The result of the function call is then stored in the variable V$_i$. As it is common for a subsequent step to depend on the results from previous steps, the argument A$_i$ refers to variables V$_1$, . . . , V$_{i-1}$ in previous steps. For example, in FIG. 2, the argument 214 in S$_3$ is "{ANSWER_1} was born in Canada.", which refers to the return variable {ANSWER_1} from S$_2$. When executing S$_3$, the variable is replaced by its actual value, and the argument becomes "Christopher Nolan was born in Canada". After executing the last step S$_4$, the return value 216 is the predicted veracity of the claim C 202.

Aggregating Reasoning Paths. Note that there might be multiple reasoning paths that can reach the final veracity label. Therefore, a diverse set of N candidate reasoning programs $\mathcal{P}$ ={P$_1$, . . . P$_N$} is generated for the input claim. After executing all programs in $\mathcal{P}$, the majority vote over all N predicted labels is taken as the final label. This approach is similar to how humans rely on multiple methods of validation to increase their confidence in fact-checking. It also makes the model less susceptible to errors in individual reasoning programs.

3. Reasoning Program Generation

In an embodiment, the program generator 204 is based on Codex, a code-pretrained LLM, which can parse natural language into symbolic representations such as SQL or Python programs. See Mark Chen, Jerry Tworek, Heewoo Jun, Qiming Yuan, Henrique Ponde de Oliveira Pinto, Jared Kaplan, Harrison Edwards, Yuri Burda, Nicholas Joseph, Greg Brockman, Alex Ray, Raul Puri, Gretchen Krueger, Michael Petrov, Heidy Khlaaf, Girish Sastry, Pamela Mishkin, Brooke Chan, Scott Gray, Nick Ryder, Mikhail Pavlov, Alethea Power, Lukasz Kaiser, Mohammad Bavarian, Clemens Winter, Philippe Tillet, Felipe Petroski Such, Dave Cummings, Matthias Plappert, Fotios Chantzis, Elizabeth Barnes, Ariel Herbert-Voss, William Hebgen Guss, Alex Nichol, Alex Paino, Nikolas Tezak, Jie Tang, Igor Babuschkin, Suchir Balaji, Shantanu Jain, William Saunders, Christopher Hesse, Andrew N. Carr, Jan Leike, Joshua Achiam, Vedant Misra, Evan Morikawa, Alec Radford, Matthew Knight, Miles Brundage, Mira Murati, Katie Mayer, Peter Welinder, Bob McGrew, Dario Amodei, Sam McCandlish, Ilya Sutskever, and Wojciech Zaremba. 2021. Evaluating large language models trained on code. *ArXiv preprint*, abs/2107.03374; Zhoujun Cheng, Tianbao Xie, Peng Shi, Chengzu Li, Rahul Nadkarni, Yushi Hu, Caiming Xiong, Dragomir Radev, Mari Ostendorf, Luke Zettlemoyer, Noah A. Smith, and Tao Yu. 2022. Binding language models in symbolic languages. *CoRR*, abs/2210.02875; Luyu Gao, Aman Madaan, Shuyan Zhou, Uri Alon, Pengfei Liu, Yiming Yang, Jamie Callan, and Graham Neubig. 2022. PAL: program-aided language models. *CoRR*, abs/2211.10435; and Wenhu Chen, Xueguang Ma, Xinyi Wang, and William W. Cohen. 2022b. Program of thoughts prompting: Disentangling computation from reasoning for numerical reasoning tasks. *CoRR*, abs/2211.12588, each incorporated herein by reference in their entirety.

Figure 3:
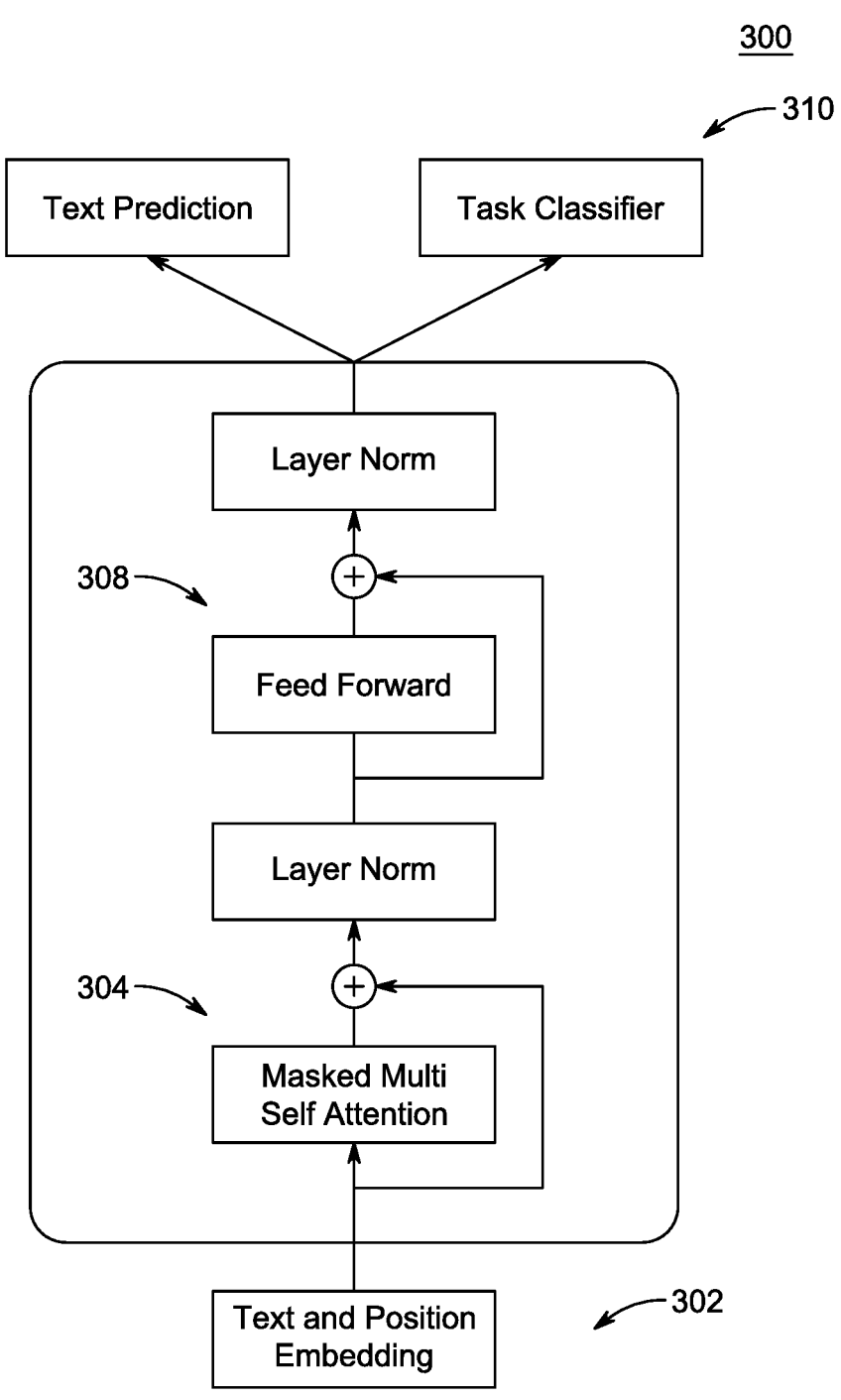
FIG. 3 is a flow diagram of a transformer decoder.

Codex uses a transformer architecture that is designed for natural language processing (NLP) tasks, in particular, a multi-layer Transformer decoder. FIG. 3 is a flow diagram for a Transformer decoder model. The model 300 includes a multi-headed self-attention operation 304 that is applied over the input context tokens 302 followed by position-wise feed forward layers 308 to produce an output distribution over target tokens 310. The input tokens 302 include a token embedding matrix and a position embedding matrix In the embodiment, the reasoning program uses a grammar that is different from the grammar of a programming language. Codex's few-shot generalization ability is used to learn effectively from only a small number of in-context examples $\mathcal{D}$ ={d$_1$, . . . , d$_{|D|}$}. Each example d$_i$ consists of a claim and a program 206. The program has a Python-like grammar, where each reasoning step is written in the format V$_i$=$f_i$(A$_i$), where the result of the function call with argument A$_i$ is stored in the variable V$_i$. An exemplary prompt template is shown in FIG. 4. At inference time, Codex uses a prompt 402 with an instruction of the task, K in-context examples, and the input claim C. Codex then attempts to complete the following texts, and thereby generates a program for C. K=20 is used to maintain a tradeoff between the diversity of reasoning types and the model's maximum input capacity. Sampling-based decoding (temperature of 0.7) is used to generate different reasoning programs for multiple runs. Temperature is used in the sampling to increase the probability of probable tokens while reducing the one that is not.

4. Sub-Task Functions

In an embodiment, three sub-task functions for the model can be called during the program execution.

QUESTION: This sub-task function is a question-answering module that takes a question Q as the input argument and returns the answer A to the question. FLAN-T5, an improved T5 model pretrained on more than 1.8K tasks with instruction tuning, is used as it has achieved state-of-the-art zero/few-shot performance on many QA benchmarks. See Hyung Won Chung, Le Hou, Shayne Longpre, Barret Zoph, Yi Tay, William Fedus, Eric Li, Xuezhi Wang, Mostafa Dehghani, Siddhartha Brahma, Albert Webson, Shixiang Shane Gu, Zhuyun Dai, Mirac Suzgun, Xinyun Chen, Aakanksha Chowdhery, Sharan Narang, Gaurav Mishra, Adams Yu, Vincent Y. Zhao, Yanping Huang, Andrew M. Dai, Hongkun Yu, Slav Petrov, Ed H. Chi, Jeff Dean, Jacob Devlin, Adam Roberts, Denny Zhou, Quoc V. Le, and Jason Wei. 2022. Scaling instruction-finetuned language models. *CoRR*, abs/2210.11416; and Colin Raffel, Noam Shazeer, Adam Roberts, Katherine Lee, Sharan Narang, Michael Matena, Yanqi Zhou, Wei Li, and Peter J. Liu. 2020. Exploring the limits of transfer learning with a unified text-to-text transformer. *J. Mach. Learn. Res.*, 21:140:1-140:67, each incorporated herein by reference in their entirety.

FLAN-T5 explores instruction finetuning with a particular focus on finetuning on chain-of-thought data. A Task Category is defined as a unique task setup (e.g., task categories such as extractive question answering, query generation, and context generation). A Task is defined as a unique <dataset, task category> pair, with any number of templates which preserve the task category.

FIG. 5 illustrates an implementation of the question-answering sub-task function 500 for three different settings. As shown in FIG. 5, the model is prompt differently depending on the settings. For the closed-book setting 506, the input prompt is Q: QUESTION? The answer is:

For the other two settings 502, 504, the input prompt is

EVIDENCE Q: QUESTION?

The answer is:

VERIFY: This is a fact verification module that takes a claim C as the input argument and returns a label of either TRUE or FALSE. FLAN-T5 510 can be used for this module, by prompting the model with the following question-answering format.

EVIDENCE

Q: Is it true that CLAIM?

True or False? The answer is:

PREDICT: This module takes as input a logical expression that performs AND, OR, NOT operations over the variables in the previous steps. Its output is returned as the predicted veracity label.

Experiments

Datasets. Most fact-checking datasets consist primarily of simple claims that can be substantiated through a single piece of evidence. However, complex claims require multi-step reasoning. Given this context, two datasets fulfill these criteria: HOVER and FEVEROUS. See Jiang et al., 2020; and Aly et al., 2021. [Jiang 2020-p. 2; Aly 2021-p. 17] The validation sets are used for evaluation since the test sets are not publicly released.

HOVER (HOppy VERification) contains claims that require integration and reasoning over multiple Wikipedia articles. HoVer is a dataset for many-hop evidence extraction and fact verification. Models can use the dataset to extract facts from several Wikipedia articles that are relevant to a claim and classify whether the claim is supported or not-supported by the facts. In HoVer, the claims require evidence to be extracted from as many as four English Wikipedia articles and embody reasoning graphs of diverse shapes. Moreover, most of the ¾-hop claims are written in multiple sentences, which adds to the complexity of understanding long-range dependency relations such as coreference.

A validation set is divided into three subsets based on the number of "hops" required to verify the claim: 1,126 two-hop claims, 1,835 three-hop claims, and 1,039 four-hop claims.

FEVEROUS (Fact Extraction and VERification Over Unstructured and Structured information) consists of 87,026 verified claims. Each claim is annotated with evidence in the form of sentences and/or cells from tables in Wikipedia, as well as a label indicating whether this evidence supports, refutes, or does not provide enough information to reach a verdict.

Subsequently, the dataset can be used on fact-checking complex claims over unstructured and structured data, where each claim is annotated with evidence in the form of sentences and/or cells from tables in Wikipedia. Since the focus in the present disclosure is on textual fact-checking, claims are selected that require exclusively sentence evidence, constituting 2,962 claims. This subset is referred to as FEVEROUS-S.

For evaluation in the open-book setting, the evaluation uses the corresponding Wikipedia corpus constructed for these two datasets as the knowledge sources. HOVER uses the October 2017 Wikipedia dump consisting of the introductory sections of 5.2 million Wikipedia pages. See Zhilin Yang, Peng Qi, Saizheng Zhang, Yoshua Bengio, William Cohen, Ruslan Salakhutdinov, and Christopher D. Manning. 2018. HotpotQA: A dataset for diverse, explainable multi-hop question answering. In *Proceedings of the 2018 Conference on Empirical Methods in Natural Language Processing (EMNLP)*, pages 2369-2380, Brussels, Belgium, each incorporated herein by reference in their entirety. FEVEROUS uses the December 2020 dump, including 5.4 million full Wikipedia articles.

Baselines. PROGRAMFC is compared to seven baselines, categorized into three groups. (i) Pre-trained models: BERT-FC and LisT5 are two models that leverage BERT and T5 for fact verification, respectively. See Amir Soleimani, Christof Monz, and Marcel Worring. 2020. BERT for evidence retrieval and claim verification. In *Advances in Information Retrieval (ECIR)*, volume 12036, pages 359-366; and Jiang et al., 2021, each incorporated herein by reference in their entirety. (ii) FC/NLI fine-tuned models: three pretrained models are chosen that are fine-tuned on other fact-checking datasets or natural language inference (NLI) datasets. RoBERTa-NLI uses fine-tuned RoBERTa-large on four NLI datasets; DeBERTaV3-NLI fine-tunes the DeBERTaV3 model on 885,242 (claim, evidence, label) annotations from FEVER and four NLI datasets. See Yixin Nie, Adina Williams, Emily Dinan, Mohit Bansal, Jason Weston, and Douwe Kiela. 2020. Adversarial NLI: A new benchmark for natural language understanding. In *Proceedings of the 58th Annual Meeting of the Association for Computational Linguistics (ACL)*, pages 4885-4901, Online; and Pengcheng He, Jianfeng Gao, and Weizhu Chen. 2021. DeBERTaV3: Improving DeBERTa using ELECTRA-style pre-training with gradient-disentangled embedding sharing. *ArXiv preprint*, abs/2111.09543, each incorporated herein by reference in their entirety. MULTIVERS is a LongFormer model fine-tuned on FEVER. See Wadden et al., 2022b; and Iz Beltagy, Matthew E. Peters, and Arman Cohan. 2020. Longformer: The long-document transformer. *ArXiv preprint*, abs/2004.05150, each incorporated herein by reference in their entirety. (iii) In-context learning models: one baseline directly uses the FLAN-T5 model in a VERIFY module for fact-checking. The other baseline uses the in-context learning of Codex for few-shot fact-checking. The implementation details are given below.

Few-Shot Learning. Few-shot learning is applied where only a few in-domain examples are available. Therefore, for a fair comparison, all models are restricted to have access to only 20 examples from HOVER or FEVEROUS-S.

These examples are used for either for fine-tuning pre-trained models (BERT-FC and LisT5), for continuous fine-tuning the FC/NLI fine-tuned models, or as in-context examples for FLAN-T5 and Codex. PROGRAMFC uses them as in-context examples for reasoning program generation.

Both the gold evidence setting and the open-book setting are evaluated. The baseline models are the same for both settings. However, during testing in the open-book setting, the models are given the retrieved evidence rather than the ground-truth evidence. BM25 implemented with the Pyserini toolkit is used as the retriever for both PRO-GRAMFC and the baselines. See Stephen E. Robertson and Hugo Zaragoza. 2009. The probabilistic relevance framework: BM25 and beyond. *Foundations and Trends in Information Retrieval*, 3 (4):333-389; and Jimmy Lin, Xueguang Ma, Sheng-Chieh Lin, Jheng-Hong Yang, Ronak Pradeep, and Rodrigo Nogueira. 2021. Pyserini: A Python toolkit for reproducible information retrieval research with sparse and dense representations. In *Proceedings of the 44th International ACM SIGIR Conference on Research and Development in Information Retrieval (SIGIR)*, pages 2356-2362, Online, each incorporated herein by reference in its entirety. The top-10 paragraphs retrieved from the knowledge corpus are used as evidence.

The overall results for PROGRAMFC and for the baselines for few-shot fact-checking are reported in Table 1. PROGRAMFC achieves the best performance on 7 out of 8 evaluations, demonstrating its effectiveness. There are three more specific observations.

directly verifying claims with FLAN-T5 on all four datasets. On average, there is a 6.0% improvement in the gold evidence setting and a 4.5% improvement in the open-book setting. This suggests that decomposing a complex claim into simpler steps with a program can facilitate more accurate reasoning. This is especially evident when the required reasoning is complex: there is a 14.9% improvement in the gold evidence setting and a 6.7% improvement in the open-book setting for 4-hop claims.

Aggregating reasoning programs is helpful. Aggregating the predictions of N=5 reasoning programs improves the performance over using a single program by an average of 1.5%. This aligns with the findings of Wang et al. (2022), where the idea was applied for question answering: if multiple different ways of thinking lead to the same answer, there can be greater confidence that the final answer is correct. This intuition also applies to fact-checking, as each program represents a unique reasoning chain to verify the claim.

Figure 6A:
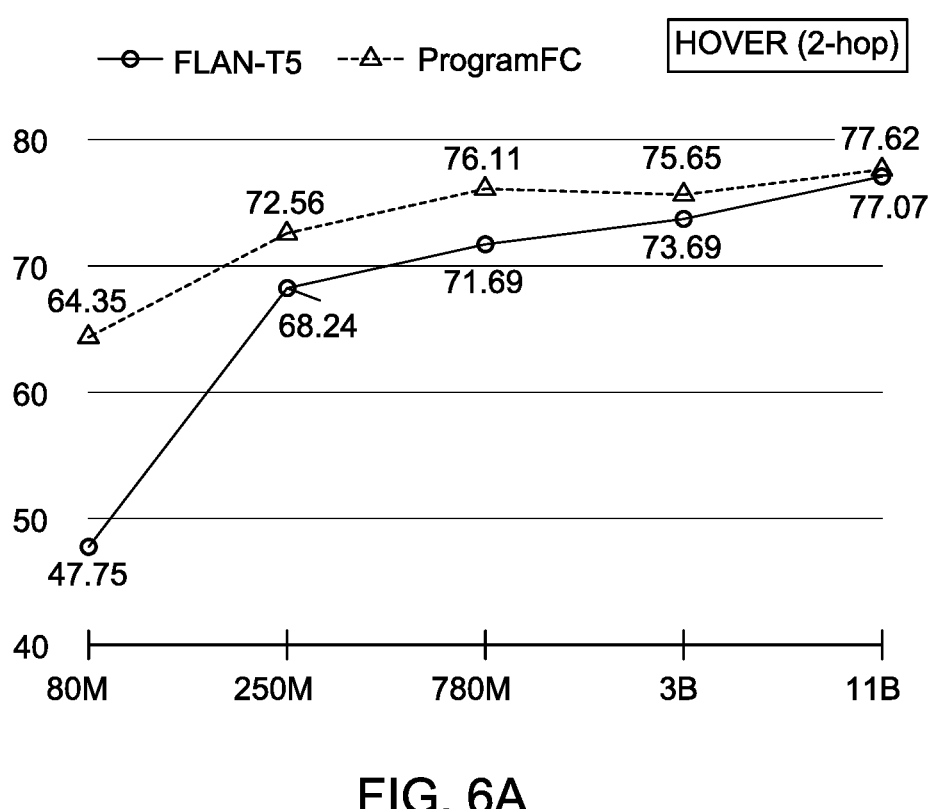
FIGS. 6A, 6B, 6C are graphs of F1 score for language models of increasing sizes.
Figure 6B:
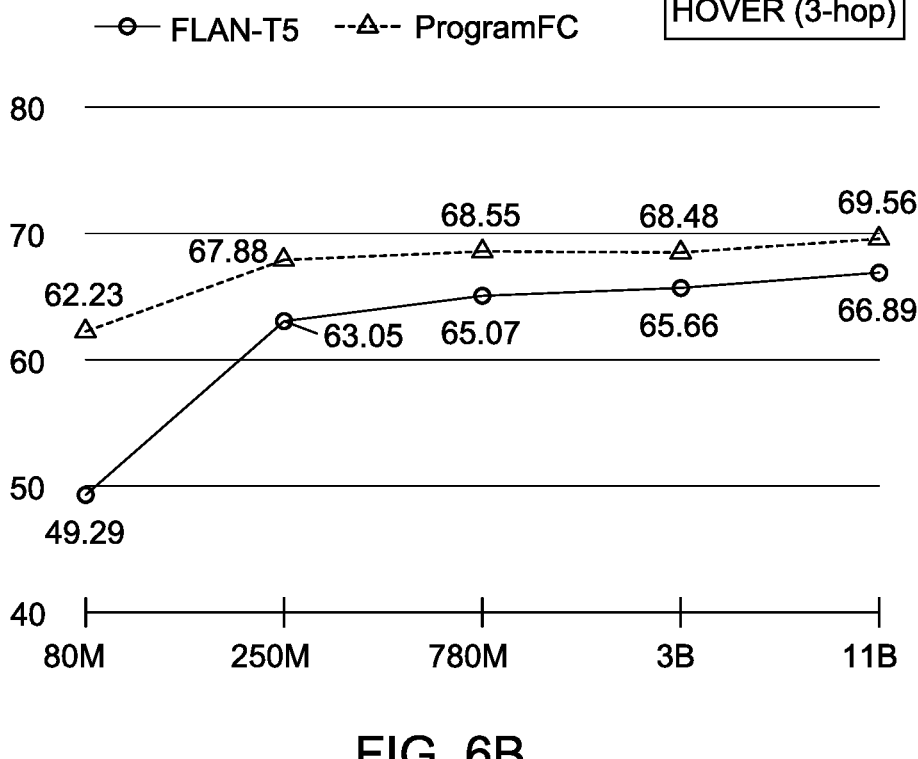
Figure 6C:
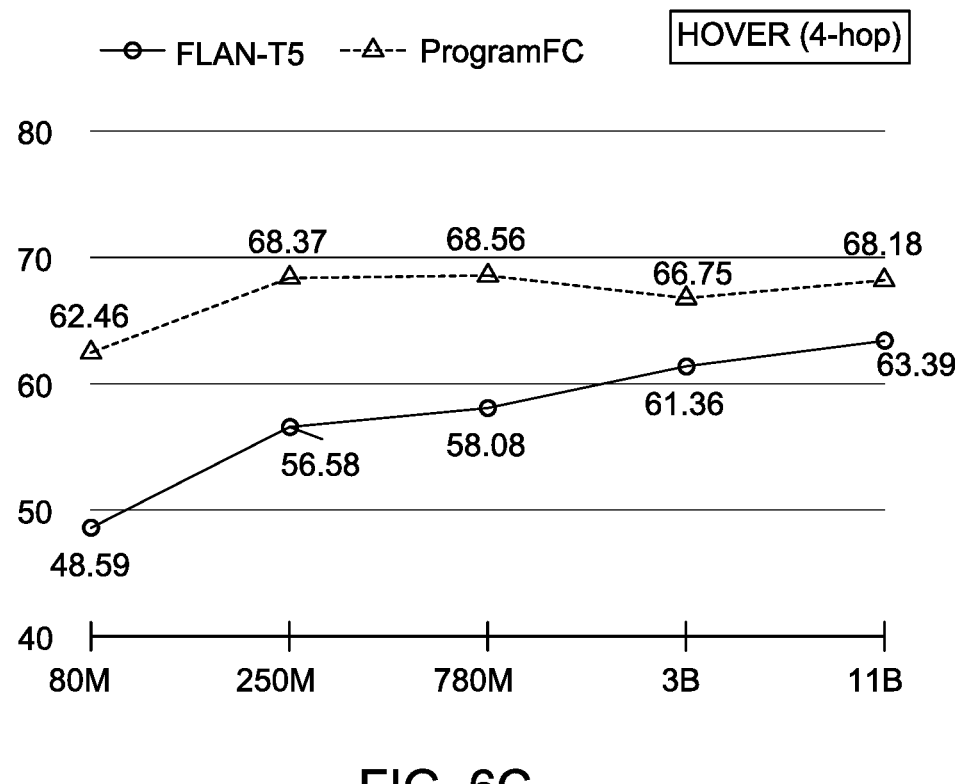

To further understand how reasoning programs facilitate fact-checking, the performance of PROGRAMFC is compared with FLAN-T5 using different language model sizes: small, base, large, XL, and XXL. FIGS. 6A-6C are graphs of F1 score for fact-checking with gold evidence using FLAN-T5 (lower line) and PROGRAMFC (upper line) for language models of increasing sizes: FLAN-T5-small (80 M), FLAN-T5-base (250 M), FLAN-large (780 M), FLAN-

TABLE 1

Macro-F1 scores of PROGRAMFC (IV) and baselines (I-III) on the evaluation
set of HOVER and FEVEROUS-S for few-shot fact-checking. Gold and Open represent
the gold evidence setting and the open book setting, respectively.

| Few-shot learning | HOVER (2-hop) | | HOVER (3-hop) | | HOVER (4-hop) | | FEVEROUS-S | |
| models | Gold | Open | Gold | Open | Gold | Open | Gold | Open |
|---|---|---|---|---|---|---|---|---|
| I  BERT-FC | 53.40 | 50.68 | 50.90 | 49.86 | 50.86 | 48.57 | 74.71 | 51.67 |
| LisT5 | 56.15 | 52.56 | 53.76 | 51.89 | 51.67 | 50.46 | 77.88 | 54.15 |
| II  ROBERTa-NLI | 74.62 | 63.62 | 62.23 | 53.99 | 57.98 | 52.40 | 88.28 | 57.80 |
| deBERTaVe-NLI | 77.22 | 68.72 | 65.98 | 60.76 | 60.49 | 56.00 | 91.98 | 58.81 |
| MULTIVERS | 68.86 | 60.17 | 59.87 | 52.55 | 55.67 | 51.86 | 86.03 | 56.61 |
| III  Codex | 70.63 | 65.07 | 66.46 | 56.63 | 63.49 | 57.27 | 89.77 | 62.58 |
| FLAN-T5 | 73.69 | 69.02 | 65.66 | 60.23 | 58.08 | 55.42 | 90.81 | 63.73 |
| IV  ProgramFC (N = 1) | 74.10 | 69.36 | 66.13 | 60.63 | 65.69 | 59.16 | 91.77 | 67.80 |
| ProgramFC (N = 5) | 75.65 | 70.30 | 68.48 | 63.43 | 66.75 | 57.74 | 92.69 | 68.06 |

I: pretrained Transformers; II: FC/NLI fine-tuned models; III: in-context learning models.

ProgramFC is more effective on deeper claims. On the HOVER dataset, ProgramFC (N=5) out-performs the baselines on average by 10.38%, 11.37%, and 14.77% on two-hop, three-hop, and four-hop claims, respectively. This suggests that ProgramFC becomes increasingly effective as the required reasoning depth increases. Among the baselines, DeBERTaV3-NLI performs comparably to ProgramFC on two-hop claims, indicating that large-scale pre-training on simpler claims can help the model generalize to more complex claims.

However, this generalization becomes more challenging as the complexity of the claims increases. On HOVER, the F1 score of DeBERTaV3-NLI drops from 77.22 for 2-hop claims to 60.49 for 4-hop claims, which is a decrease of 21.7%. In contrast, the performance drop for ProgramFC, which uses the strategy of program-guided reasoning, is much smaller: just 11.7%.

Decomposition is more effective than one-step prediction. The ProgramFC model, which uses the same FLAN-T5 model as the sub-task functions, outperforms the baseline of T5-XL (3 B), and FLAN-T5-XXL (11 B) on HOVER 2-hop (FIG. 6A), 3-hop (FIG. 6B), and 4-hop (FIG. 6C).

The results shown in FIGS. 6A-6C indicate that program-guided reasoning is particularly effective when the model size is small. As smaller models have less capacity for complex reasoning, the performance of the end-to-end FLAN-T5 model decreases significantly with decreasing model size. However, this trend is less notable for PRO-GRAMFC. The high-level reasoning plan offered by reasoning programs substantially alleviates the demands on the subsequent sub-task solvers. The results show that the program-guided model using FLAN-T5-small (80 M parameters) as sub-task solvers can achieve comparable performance to the 137× larger FLAN-T5-XXL (11 B) model with end-to-end reasoning for 4-hop claims.

Figure 7:
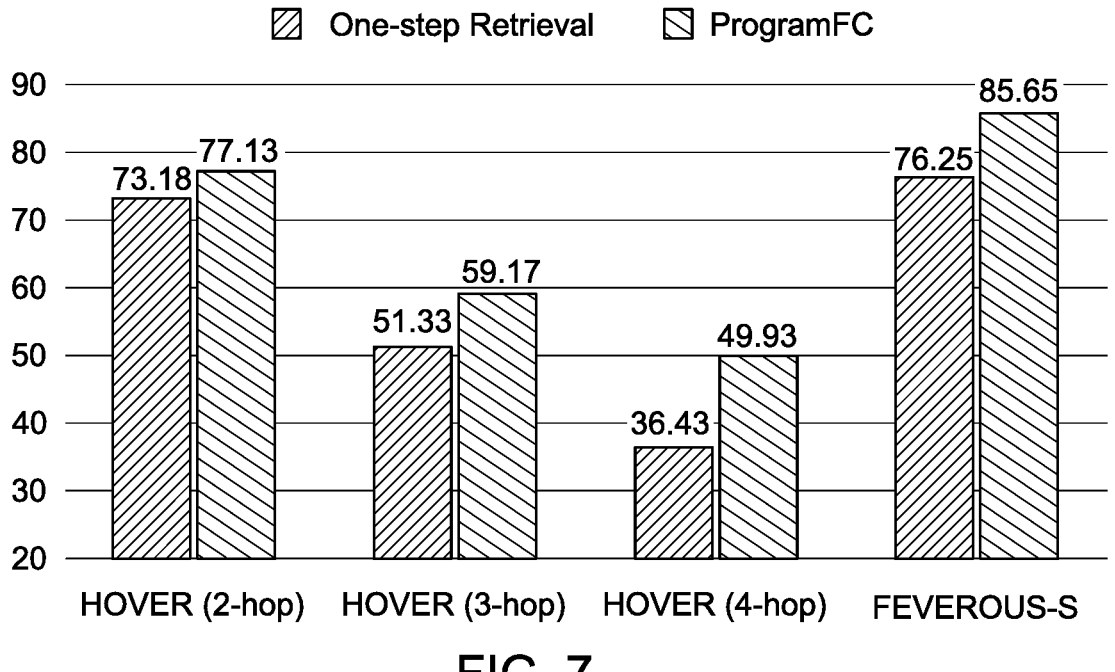
FIG. 7 is a bar chart for retrieval recall.

In the open-domain setting, reasoning programs can enhance the retrieval of relevant evidence from the knowledge source. FIG. 7 compares the retrieval performance of the one-step BM25 retriever used in the baselines to the iterative step-by-step BM25 retriever in PROGRAMFC.

The recall of the gold paragraphs can be measured for the top-10 retrieved paragraphs (recall@10). For PROGRAMFC, the retrieved paragraphs of all steps are combined and the top-10 results are considered. FIG. 7 shows that PROGRAMFC outperforms one-step retrieval on all datasets, with the largest improvement of 37.1% on HOVER 4-hop. This is because some information may not be present in the original claim, but is only revealed during the reasoning process (e.g., "Christopher Nolan" in FIG. 2). Thus, iterative retrieval guided by the reasoning program yields better results.

An advantage of PROGRAMFC is that it improves the interpretability of fact-checking compared to end-to-end models, as the explicit program can aid human understanding and debugging. FIG. 8 is a sample error case from the HOVER 4-hop dataset. FIG. 8 illustrates an error case from the HOVER 4-hop dataset where the generated reasoning program has an incorrect program structure. The incorrect segment(s) are marked through, and the correct revisions are indicated by an arrow. Examples of generated reasoning programs are shown in FIG. 9. To assess the quality of the generated reasoning programs, 300 claims are sampled where PROGRAMFC incorrectly predicted the final veracity labels from the HOVER 2-hop, 3-hop, and 4-hop datasets, with 100 examples per dataset. Human annotators are asked to analyze the error types and he results are classified into three categories: (i) Syntactic errors, where the program does not conform to the defined grammar and cannot be parsed, (ii) Semantic errors, which include incorrect or missing arguments/variables (Token), incorrect program structure (Structure), and incorrect sub-task calls (Subtask), and (iii) Incorrect execution, where the program is correct, but where the incorrect prediction is a result of its execution.

The error analysis is shown in Table 2. First, no syntax errors were found in the samples, indicating that Codex effectively generates executable programs through few-shot in-context learning.

Second, for 2-hop claims, 71% of the programs are found to be correct and the majority of the errors are the result of incorrect program execution, where the question answering or the fact-checking modules failed to return the correct answer.

Third, as the complexity of the claims increased, the proportion of semantic errors in the programs increased, with structural errors becoming particularly prevalent. This highlights the difficulty of generating the appropriate step-by-step reasoning strategies for claims that require long-chain reasoning. An example structural error is shown in FIG. 6, where the model fails to parse the second sentence of the claim into correct program instructions. Additional error examples can be found below.

Finally, the closed-book setting is evaluated, where the model does not have access to any knowledge source and needs to rely on its parametric knowledge only. The baseline models from groups I and II in Table 1 are trained with (evidence, claim) pairs and thus are not applicable in this setting. The disclosed method is compared to the baselines that use large language models for in-context learning, including Codex (code-davinci-002) and FLAN-T5 from Table 1.

The 175B-parameter Instruct-GPT (text-davinci-002) is included with four different prompts: (i) direct prompting with the claim, (ii) CoT or chain-of-thought prompting with demonstrations, (iii) ZS-CoT or zero-shot chain-of-thought with the prompt "let's think step by step", and (iv) Self-Ask, which is a variant of CoT that guides the model reasoning by asking a series of questions. See Ouyang et al., 2022; Wei et al., 2022; Kojima et al., 2022; and Ofir Press, Muru Zhang, Sewon Min, Ludwig Schmidt, Noah A. Smith, and Mike Lewis. 2022. Measuring and narrowing the compositionality gap in language models. *CoRR*, abs/2210.03350, each incorporated herein by reference in their entirety. Exemplary prompting templates are given in FIGS. 13A-13D.

The results, presented in Table 3, show that most models achieve a Macro-F1 score only slightly above random guessing on the HOVER dataset, indicating the difficulty of solely relying on parametric knowledge of large language models for fact-checking complex claims. Similarly to the observations in Section 4.1, there is a trend of improved performance as the number of the required reasoning hops increases. Chain-of-thought prompting scores an average 2.7 points higher than direct prompting, highlighting the importance of step-by-step reasoning for complex fact-checking. It outperforms PROGRAMFC on HOVER 2-hop and FEVEROUS but performs worse on HOVER 3-hop and 4-hop.

TABLE 2

Reasoning program evaluation for incorrectly-predicted examples from each hop length in HOVER.

| | Proportion (%) | | |
| --- | --- | --- | --- |
| Error Type | 2-hop | 3-hop | 4-hop |
| Syntax error | 0% | 0% | 0% |
| Semantic error | 29% | 38% | 77% |
| Token | 8% | 20% | 18% |
| Structure | 19% | 13% | 57% |
| Subtask | 2% | 5% | 2% |
| Incorrect execution | 71% | 62% | 23% |

TABLE 3

Closed-book setting: macro-F1 scores for PROGRAMFC and for the baselines.

| | HOVER | | | |
| --- | --- | --- | --- | --- |
| Model | 2-hop | 3-hop | 4-hop | FEVEROUS |
| InstructGPT | | | | |
| Direct | 56.51 | 51.75 | 49.68 | 60.13 |
| ZS-CoT | 50.30 | 52.30 | 51.58 | 54.78 |
| CoT | 57.20 | 53.66 | 51.83 | 61.05 |
| Self-Ask | 51.54 | 51.47 | 52.45 | 56.82 |
| Codex | 55.57 | 53.42 | 45.59 | 57.85 |
| FLAN-T5 | 48.27 | 52.11 | 51.13 | 55.16 |
| ProgramFC | 54.27 | 54.18 | 52.88 | 59.66 |

This can be due to CoT generating free-form explanations, which can lead to unpredictable errors in long reasoning chains. In contrast, our program generation-and-execution strategy is more stable for longer reasoning chains.

PROGRAMFC can be adapted to more real-world fact-checking scenarios, such as fake news detection and multi-modal fact-checking, with advanced reasoning program design and sub-task functionalities.

PROGRAMFC can be adapted to implicit reasoning. The claims in the HOVER and the FEVEROUS datasets, despite being complex in their surface form, mostly only require explicit multi-step reasoning, i.e., the decomposition can be derived from the claim's syntactic structure or how the claim is framed. However, for many real-world complex claims, the reasoning is often implicit. For example, for the claim "Aristotle couldn't have used a laptop", the reasoning program looks as follows:

answer_1=Question("When did Aristotle live?");
answer_2=Question("When was the laptop invented?");
fact_1=Verify("answer_1 is before answer_2.");
label=Predict(fact_1)

Generating reasoning programs for such implicit complex claims can be achieved using a deeper understanding of the claim and also access to world and commonsense knowledge. The Codex-based generator struggles to produce a correct reasoning program. PROGRAMFC can be implemented with an alternative large language model to fact-check real-world claims.

PROGRAMFC has a higher computational cost than the baseline end-to-end fact-checking models. It requires calling large language models for program generation and further calling multiple sub-task models. This results in the actual computational time that is ~4-5× higher than for an end-to-end FLAN-T5 model. PROGRAMFC can be implemented with more efficient methods for program generation and execution.

Environmental Impact. The use of large language models requires a significant amount of computation and the use of GPUs/TPUs for training, which contributes to global warming. In the present disclosure, this is less of an issue, as such models are not trained from scratch; rather, few-shot in-context learning is performed.

A. Implementation Details about the Baselines

Implementation details are provided for the seven baselines used. Typical ways to perform few-shot fact-checking using large language models are fine-tuning and in-context learning. Thus, the baselines are categorized into three categories.

A.1 Pre-Trained Models

Pre-trained models use pretrained Transformers such as BERT and T5 for fact-checking. See Ashish Vaswani, Noam Shazeer, Niki Parmar, Jakob Uszkoreit, Llion Jones, Aidan N. Gomez, Lukasz Kaiser, and Illia Polosukhin. 2017. Attention is all you need. In *Advances in Neural Information Processing Systems* 30: *Annual Conference on Neural Information Processing Systems* (*NeurIPS*), pages 5998-6008, Long Beach, California, USA; Jacob Devlin, Ming-Wei Chang, Kenton Lee, and Kristina Toutanova. 2019. BERT: Pre-training of deep bidirectional transformers for language understanding. In *Proceedings of the* 2019 *Conference of the North American Chapter of the Association for Computational Linguistics: Human Language Technologies* (*NAACL-HLT*), pages 4171-4186, Minneapolis, Minnesota, USA; and Raffel et al., 2020, each incorporated herein by reference in their entirety. For few-shot learning, fine-tune them using 20 randomly sampled training examples from HOVER or FEVEROUS. The training is run 10 times with different random seeds and report the average performance on the validation set. Two models are considered:

BERT-FC (Soleimani et al., 2020): It uses BERT for claim verification. The claim and the evidence are concatenated ([CLS] claim [SEP] evidence) and used as input for a binary classification task to predict the veracity label of the claim. The bert-large-uncased (345 M parameters) model is provided in HuggingFace.2

LisT5 (Jiang et al., 2021): This is a fact-checking framework built with a pretrained sequence-to-sequence transformer, namely T5 (Raffel et al., 2020), as its backbone. The "listwise concatenation" is proposed in the paper for label prediction, which concatenates all candidate evidence sentences into a single input and the t5-large model can be trained to directly classify the claim as Supported or Refuted. The original implementation of this model can be used.

A.2 FC/NLI Fine-Tuned Models

These models are pretrained Transformer models that have been specifically fine-tuned on single-hop fact-checking datasets (e.g., FEVER) or natural language inference (NLI) datasets. This additional training allows these models to excel at fact-checking simple claims, and thus they can generalize better to complex claims that require multi-hop reasoning during further few-shot fine-tuning.

In this category, the following three fine-tuned models are selected:

RoBERTa-NLI fine-tunes RoBERTa-large on a combination of four well-known NLI datasets: SNLI, MNLI, FEVER-NLI, ANLI (R1, R2, R3). See Nie et al., 2020; Yinhan Liu, Myle Ott, Naman Goyal, Jingfei Du, Mandar Joshi, Danqi Chen, Omer Levy, Mike Lewis, Luke Zettlemoyer, and Veselin Stoyanov. 2019. RoBERTa: A robustly optimized BERT pretraining approach. *ArXiv preprint*, abs/1907.11692; Samuel R. Bowman, Gabor Angeli, Christopher Potts, and Christopher D. Manning. 2015. A large annotated corpus for learning natural language inference. In *Proceedings of the* 2015 *Conference on Empirical Methods in Natural Language Processing* (*EMNLP*), pages 632-642, Lisbon, Portugal; Adina Williams, Nikita Nangia, and Samuel Bowman. 2018. A broad-coverage challenge corpus for sentence understanding through inference. In *Proceedings of the* 2018 *Conference of the North American Chapter of the Association for Computational Linguistics: Human Language Technologies* (*NAACLHLT*), pages 1112-1122, New Orleans, Louisiana, USA; Yixin Nie, Haonan Chen, and Mohit Bansal. 2019. Combining fact extraction and verification with neural semantic matching networks. In *Proceedings of the 33rd AAAI Conference on Artificial Intelligence* (*AAAI*), pages 6859-6866, Honolulu, Hawaii, USA; and Nie et al., 2020, each incorporated herein by reference in their entirety. The public model checkpoint is available at HuggingFace4 and can be further fine-tuned with 20 random examples from HOVER/FEVEROUS.

DeBERTaV3-NLI fine-tunes the DeBERTaV3-large model on 885,242 NLI hypothesis-premise pairs from FEVER and on four NLI datasets: MNLI, ANLI, LingNLI, and WANLI (Liu et al., 2022). See He et al., 2021; Alicia Parrish, William Huang, Omar Agha, Soo-Hwan Lee, Nikita Nangia, Alexia Warstadt, Karmanya Aggarwal, Emily Allaway, Tal Linzen, and Samuel R. Bowman. 2021. Does putting a linguist in the loop improve NLU data collection? In *Findings of the Association for Computational Linguistics: EMNLP* 2021, pages 4886-4901, Punta Cana, Dominican Republic; and Alisa Liu, Swabha Swayamdipta, Noah A. Smith, and Yejin Choi. 2022. WANLI: Worker and AI collaboration for natural language inference dataset creation. In *Findings of the Association for Computational Linguistics: EMNLP* 2022, pages 6826-6847, Abu Dhabi, United Arab Emirates, each incorporated herein by reference in their entirety. This is the best-performing NLI model on HuggingFace as of Jun. 6, 2022.5 MULTIVERS (Wadden et al., 2022b), formerly known as LongChecker, uses the Long-Former (Beltagy et al., 2020) for claim verification to address the long input evidence problem. A model checkpoint can be fine-tuned on FEVER.

A.3 In-Context Learning Models

These models have recently shown strong few-shot learning ability in various NLP tasks. By prompting a large language model with a few in-context examples, the model can quickly learn a task from demonstrations. To make a fair comparison to the disclosed model, two in-context learning baselines are used as follows:

Codex (Chen et al., 2021) is used in the disclosed model to generate reasoning programs. One straightforward baseline directly uses it for fact-checking. To this end, a prompt for Codex (code-davinci-002) is as follows: "<Evidence> Based on the above information, is it true that <Claim>?True or False? The answer is:". Prefix the same 20 in-context examples for the disclosed model before the prompt as demonstrations.

FLAN-T5 (Chung et al., 2022) is an improved version of T5, which is fine-tuned on 1.8K tasks phrased as instructions, with and without exemplars, i.e., zero-shot and few-shot. The model has shown strong performance in various in-context few-shot learning NLP tasks, such as reasoning, and question-answering. A prompt for the model can be: "<Evidence> Q: <Claim> Is it true that <Claim>? True or False? The answer is:", prefixing with the same 20 in-context examples. The disclosed model uses the same model size as FLAN-T5-XXL 3B for fair comparison.

B. Examples of Generated Reasoning Programs

FIG. 8 shows six examples of generated reasoning programs by PROGRAMFC that cover diverse reasoning chains.

C. Error Analysis for Reasoning Programs

FIGS. 9A-9C shows five examples of erroneous cases where the generated reasoning programs are incorrect. Explanations are provided for each of the error cases below:

Example 1 in FIG. 10A generates a wrong logical reasoning operator for the final step. The correct logic should be "not (fact_1 and fact_2)" instead of "fact_1 and fact 2".

Example 2 in FIG. 10A fails to perform co-reference resolution for the arguments in the third and the fourth reasoning steps. "This album" should be replaced with "The bluegrass" to make the sub-task context-independent. "This musical" should be replaced with the variable "answer_1" from the first step.

Example 3 in FIG. 10B fails to create a meaningful problem decomposition for the claim. It generates a trivial program that simply repeats the original claim.

Example 4 in FIG. 10B fails to generate a fine-grained reasoning structure for the input claim. It also generates a trivial program that simply separates the claim into sentences.

Example 5 in FIG. 10C generates a redundant reasoning step "Question ("When was the musician born?")", which does not add any new information to the reasoning chain.

D. Program Generation Prompts

FIG. 11 are exemplary prompts for program generation for the HOVER dataset. FIG. 12 are exemplary prompts for program generation for the FEVEROUS-S dataset.

E. Prompts for Closed-Book Fact-Checking

FIGS. 13A-13D are exemplary templates for prompting methods for the closed-book fact-checking setting. The templates are for use with InstructGPT, which is a language model that is designed to follow instructions given in a text prompt. The templates are for four prompting methods used for InstructGPT for the closed-book fact-checking setting.

The exemplary templates are for prompts for an answer for a true/false question . . . FIG. 13A is an exemplary template for Direct Prompting. A direct prompt is just the text that is given to a model to continue it. FIG. 13B is an exemplary template for Zero-Shot Chain of Thought (ZS-CoT) Prompting. FIG. 13C is an exemplary template for CoT Prompting. In Chain of Thought (CoT) prompting, models decompose multi-step problems into intermediate steps. FIG. 13D is an exemplary prompt for Self-Ask Prompting. In self-ask prompting, the model first generates and then answers sub-questions about the main input question, before answering the input question.

Figure 14:
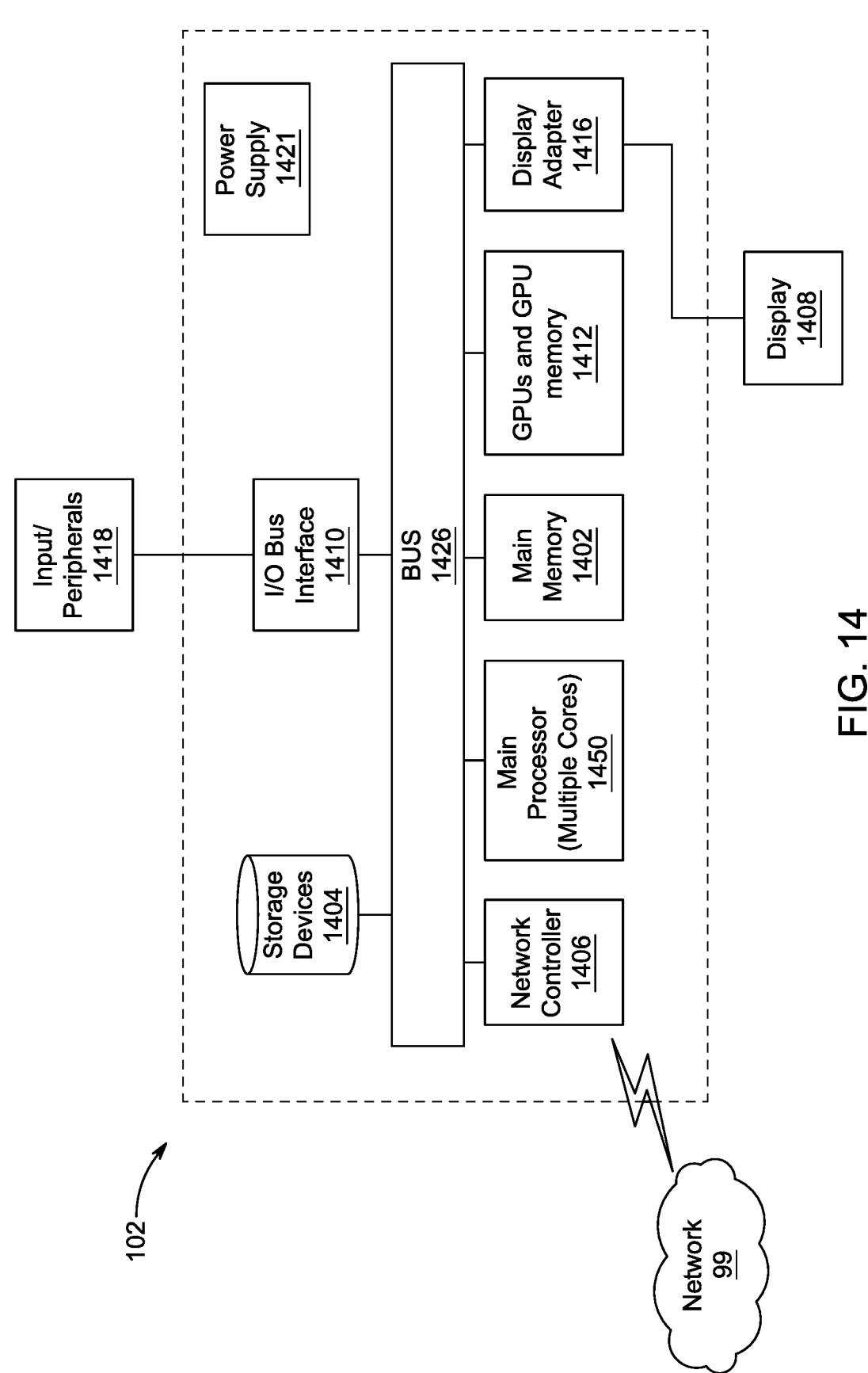
FIG. 14 is a block diagram for a computer system.

FIG. 14 is a block diagram illustrating an example computer system for implementing the machine learning training and inference methods according to an exemplary aspect of the disclosure. The computer system may be an AI workstation running an operating system, for example Ubuntu Linux OS, Windows, a version of Unix OS, or Mac OS. The computer system 1400 may include one or more central processing units (CPU) 1450 having multiple cores. The computer system 1400 may include a graphics board 1412 having multiple GPUs, each GPU having GPU memory. The graphics board 1412 may perform many of the mathematical operations of the disclosed machine learning methods. The computer system 1400 includes main memory 1402, typically random access memory RAM, which contains the software being executed by the processing cores 1450 and GPUs 1412, as well as a non-volatile storage device 1404 for storing data and the software programs. Several interfaces for interacting with the computer system 1400 may be provided, including an I/O Bus Interface 1410, Input/Peripherals 1418 such as a keyboard, touch pad, mouse, Display Adapter 1416 and one or more Displays 1408, and a Network Controller 1406 to enable wired or wireless communication through a network 99. The interfaces, memory and processors may communicate over the system bus 1426. The computer system 1400 includes a power supply 1421, which may be a redundant power supply.

In some embodiments, the computer system 1400 may include a server CPU and a graphics card by NVIDIA, in which the GPUs have multiple CUDA cores. In some embodiments, the computer system 1400 may include a machine learning engine 1412.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A system for fact checking electronically posted claims, comprising:

an input/output device for inputting a textual complex claim as a natural language statement with a combination of two or more facts and outputting an indication that the textual complex claim is true or false and an explanation for the indication, wherein the explanation represents a reasoning program that is used to guide, in a step-by-step manner, a reasoning process to obtain the indication; and processing circuitry configured to generate, by a program generation module, the reasoning program for the input complex claim as a sequence of reasoning steps, where each step directs to a function in a set of sub-task functions, and delegate, by a program execution module, each step in the reasoning program to a respective sub-task function and execute the respective sub-task function in order to provide the outputted indication, wherein the explanation includes a plurality of sub-tasks described in a programming language, each sub-task corresponding to a step of the reasoning program, and wherein the set of sub-task functions includes:

a Verify function for verifying whether an argument is true or false, a Question function for taking an argument as a question and generating an answer for the question, and a Predict function for predicting a veracity of an argument.

2. The system of claim 1, wherein the input/output device is configured to convert an audio signal into the textual complex claim.

3. The system of claim 1, wherein the input/output device is configured to display the indication as a first graphical icon for a true claim and a second different graphical icon for a false claim.

4. The system of claim 1, wherein the input/output device is configured to output the indication, by a speaker, as a verbal output.

5. The system of claim 1, wherein the program generation module includes a large language deep learning model that has been trained to map the textual complex claim to the reasoning program steps.

6. The system of claim 1, wherein the program execution module comprises:

a question-answering sub-task module that takes a question as an input and returns an answer to the question, and a fact verification sub-task module that uses a transformer module that receives a question-answer prompt and returns a Boolean label.

7. The system of claim 1, wherein the program execution module comprises:

a predict sub-task module that takes as input a logical expression that performs one or more of AND, OR, and NOT operations over variables in previous steps and returns a predicted veracity label.

8. The system of claim 1, wherein the programming language is Structured Query Language (SQL) or Python.

9. A non-transitory computer-readable storage medium including computer executable instructions, wherein the instructions are a framework including a program generation module and a program execution module, which when executed by a computer, cause the computer to perform a method for fact checking electronically posted claims, the method comprising:

inputting a textual complex claim as a natural language statement with a combination of two or more facts;

generating, by the program generation module, a reasoning program having at least one program step for the input complex claim as a sequence of reasoning steps, where each program step directs to a function in a set of sub-task functions;

delegating, by the program execution module, each step in the reasoning program to a respective sub-task function and executing the respective sub-task function; and outputting, as a result of the reasoning program, an indication that the textual complex claim is true or false and an explanation for the indication, the explanation representing the reasoning program to show a reasoning process used to obtain the indication, wherein the explanation includes a plurality of sub-tasks described in a programming language, each sub-task corresponding to a step of the reasoning program, and wherein the set of sub-task functions includes:

a Verify function for verifying whether an argument is true or false, a Question function for taking an argument as a question and generating an answer for the question, and a Predict function for predicting a veracity of an argument.

10. The storage medium of claim 9, wherein the inputting includes converting an audio signal into the textual complex claim.

11. The storage medium of claim 9, wherein the indication is a first graphical icon for a true claim and a second different graphical icon for a false claim.

12. The storage medium of claim 9, wherein the outputting an indication step includes outputting, by a speaker, a verbal output.

13. The storage medium of claim 9, further comprising: a last step by the program generation module of returning veracity of the textual complex claim.

14. The storage medium of claim 9, wherein the program generation module includes a large language model that has been trained to map the textual complex claim to the reasoning program steps.

15. The storage medium of claim 9, wherein the program execution module comprises:

a question-answering sub-task module that takes a question as an input and returns an answer to the question, and a fact verification sub-task module that uses a transformer module that receives a question-answer prompt and returns a Boolean label.

16. The storage medium of claim 9, wherein the program execution module comprises:

a predict sub-task module that takes as input a logical expression that performs one or more of AND, OR, and NOT operations over variables in previous steps and returns a predicted veracity label.

17. The storage medium of claim 9, wherein the sub-task functions of the program execution module are a shared library of specialized sub-task functions.

18. The storage medium of claim 17, wherein the sub-tasks are in a form of Action (Argument), wherein Action and Argument define a sub-task type and content of the sub-task, respectively.

19. The storage medium of claim 9, wherein the programming language is Structured Query Language (SQL) or Python.

\* \* \* \* \*